(12) United States Patent
Saito et al.

(10) Patent No.: US 7,874,413 B2
(45) Date of Patent: Jan. 25, 2011

(54) ROTATION TRANSMISSION DEVICE

(75) Inventors: Takahide Saito, Iwata (JP); Koji Akiyoshi, Iwata (JP); Takanobu Sato, Iwata (JP); Masako Ashimori, Iwata (JP)

(73) Assignee: NTN Corporation, Osaka (JP)

( * ) Notice: Subject to any disclaimer, the term of this patent is extended or adjusted under 35 U.S.C. 154(b) by 646 days.

(21) Appl. No.: 11/850,883

(22) Filed: Sep. 6, 2007

(65) Prior Publication Data
US 2008/0060896 A1 Mar. 13, 2008

(30) Foreign Application Priority Data

Sep. 11, 2006 (JP) ............................ 2006-245142
Apr. 5, 2007 (JP) ............................ 2007-099495

(51) Int. Cl.
*F16D 41/08* (2006.01)
(52) U.S. Cl. ............................ 192/35; 192/38; 192/40; 192/44; 192/84.8
(58) Field of Classification Search ................ 192/84.8; 267/166.1
See application file for complete search history.

(56) References Cited

U.S. PATENT DOCUMENTS 1,726,329 A * 8/1929 Aiken .......................... 192/47
1,751,261 A * 3/1930 Wilson ...................... 267/166.1

FOREIGN PATENT DOCUMENTS

JP 2003-262238 9/2003
JP 2006-29445 A * 2/2006

* cited by examiner

*Primary Examiner*—Rodney H Bonck
(74) *Attorney, Agent, or Firm*—Wenderoth, Lind & Ponack, L.L.P.

(57) ABSTRACT

A rotation transmission device which can quickly change the direction of rotation includes an inner ring having cam surfaces on its outer periphery, an outer ring having a cylindrical surface on its inner periphery, and pairs of circumferentially opposed rollers, the rollers of each pair being disposed between one of the cam surfaces and the cylindrical surface to be circumferentially opposed to each other. A roller separation spring is disposed between the rollers of each pair of rollers to bias the rollers away from each other so that the rollers are wedged between the cam surface and the cylindrical surface. The rollers are retained by a roller retainer which can change the distance between the rollers of each pair of rollers. By reducing the distance between the rollers of each pair of rollers with the roller retainer, the rollers can be disengaged from the cam surfaces and the cylindrical surface.

12 Claims, 21 Drawing Sheets

ROTATION TRANSMISSION DEVICE

BACKGROUND OF THE INVENTION

This invention relates to a rotation transmission device used for selectively transmitting power through a power transmission line.

Conventional rotation transmission devices for selectively transmitting power typically include an inner ring and an outer ring, with cam surfaces and a cylindrical surface formed on one and the other of the outer periphery of the inner ring and the inner periphery of the outer ring, respectively, a plurality of pairs of rollers, each pair being disposed between the cylindrical surface and one of the cam surfaces and circumferentially opposed to each other, and a roller retainer for maintaining the distance between the rollers of each pair of circumferentially opposed rollers. The roller retainer is circumferentially movable between a position where the rollers are wedged between the cam surfaces and the cylindrical surface and a position where the rollers are disengaged from the cam surfaces and the cylindrical surface.

In this rotation transmission device, while the rollers are not wedged between the cam surfaces and the cylindrical surface, rotation is not transmitted between the inner and outer rings. When the rollers are wedged between the cam surfaces and the cylindrical surface, rotation is transmitted between the inner and outer rings. In order to change the direction of rotation to be transmitted between the inner and outer rings, it is necessary to circumferentially move the roller retainer from the position where the rollers are wedged in one rotational direction to the position where the rollers are wedged in the opposite rotational direction, relative to one of the inner and outer rings that is formed with the cam surfaces.

In order to improve the response of such changes in the direction of rotation, JP patent publication 2003-262238A proposes to circumferentially arrange either the cam surfaces or the rollers with equal pitches and the others with unequal pitches. With this arrangement, because rollers that are wedged when transmitting rotation in one direction are different from rollers that are wedged when transmitting rotation in the opposite direction, it is possible to minimize the distance by which the roller retainer has to be circumferentially moved to change the direction of rotation, thereby improving the response of such changes in direction of rotation.

But with this rotation transmission device, in order to change the direction in which rotation is transmitted between the inner and outer rings, it is necessary to circumferentially move the roller retainer from the position where the rollers are wedged in one rotational direction to the position where the rollers are wedges in the opposite rotational direction. Thus, a delay in response necessarily occurs because the roller retainer has to be moved to change the direction of rotation. Thus, it may be difficult to sufficiently quickly change the direction of rotation. If the distance by which the roller retainer has to be moved to change the direction of rotation is reduced in an attempt to improve the response of changes in the direction of rotation, the rollers are more likely to be untimely wedged between the cam surfaces and the cylindrical surface, so that the reliability in operation deteriorates.

An object of this invention is to provide a rotation transmission device which can more quickly change the direction of rotation.

SUMMARY OF THE INVENTION

In order to achieve this object, the present invention provides a rotation transmission device comprising an inner ring having an outer periphery, an outer ring having an inner periphery, one of the outer periphery and inner periphery being formed with cam surfaces, and the other of the outer periphery and inner periphery being formed with a cylindrical surface, a plurality of pairs of rollers, the rollers of each pair being disposed between one of the cam surfaces and the cylindrical surface to circumferentially face each other, roller separation springs each disposed between the rollers of one of the pairs of rollers to bias the rollers of each of said pairs of rollers away from each other until wedged between the one of the cam surfaces and the cylindrical surface, and a roller retainer retaining the rollers and capable of changing the distance between the rollers of each of the pairs of rollers, whereby the rollers are disengageable from the cam surfaces and the cylindrical surface by reducing the circumferential distance between the rollers of each of the pairs of rollers with the roller retainer.

The roller retainer may be elastically retained by one of the inner ring and the outer ring that is formed with the cam surfaces. Alternatively, the roller separation springs may be fixed to one of the inner ring and the outer ring that is formed with the cam surfaces. In the latter case, the roller separation springs may be fixed to said one of the inner and outer rings directly or through a spring retainer. That is, the rotation transmission device may further comprise a spring retainer for retaining the roller separation springs, the spring retainer being fixed to said one of the inner ring and the outer ring, thereby fixing the roller separation springs in position.

Preferably, this rotation transmission device is structured as follows:

1) The rotation transmission device further comprises stoppers each disposed between the rollers of one of the pairs of rollers for restricting the minimum distance between the rollers of each of the pairs of rollers, thereby preventing breakage of the roller separation springs.

2) The roller separation springs comprise coil springs having contact portions that are brought into contact with the respective rollers, the contact portions having an increased diameter.

The roller retainer may comprise first and second annular retainer members that are circumferentially movable relative to each other, the first and second annular retainer members having first axial protrusions and second axial protrusions, respectively, to support the rollers of each of the pairs of rollers with one of the first axial protrusions and one of the second axial protrusions that is adjacent to the one of the first axial protrusions, whereby the distance between the rollers of each of the pairs of rollers is changeable by circumferentially moving the first and second annular retainer members relative to each other.

The first and second annular retainer members may be axially movable relative to each other, the first and second annular retainer members having first and second contact surfaces, respectively, that are in sliding contact with each other, the first and second contact surfaces being configured such that when the first and second annular retainer members move axially relative to each other with the first and second contact surfaces in sliding contact with each other, the first and second annular retainer members are also circumferentially moved relative to each other.

Preferably, this rotation transmission device is configured as follows:

1) The first and second protrusions are in abutment with the respective rollers at portions that are spaced from the respective cam surfaces by a larger distance than are the centers of the respective rollers.

2) The rotation transmission device further comprises a retainer stopper disposed between one of the first axial protrusions and one of the second axial protrusions that is adjacent to the one of the first protrusions and fixed to one of the inner and outer rings that is formed with the cam surfaces, whereby the first and second annular retainer members are retained in position by bringing the first and second annular retainer members into abutment with the retainer stopper.

In order to axially move the first and second annular retainer members relative to each other, the rotation transmission device may be configured as follows:

1) The rotation transmission device further comprises an annular armature made of a magnetic material and rotatably but axially immovably mounted on the first annular retainer member, a field core axially spaced from the armature, and an electromagnetic coil wound on the field core, whereby the first and second annular retainer members can be axially movable relative to each other by energizing the electromagnetic coil.

2) The rotation transmission device further comprises an annular armature made of a magnetic material and integrally formed on the first annular retainer member, an annular rotor rotationally fixed to one of the inner and outer rings that is formed with the cam surfaces and axially facing the armature, a field core axially facing the armature with the rotor disposed between, and an electromagnetic coil wound on the field core, whereby the first and second annular retainer members can be axially movable relative to each other by energizing the electromagnetic coil.

According to the present invention, with the rollers of each pair of circumferentially opposed rollers both wedged between the cam surface and the cylindrical surface, the rotation in one direction can be transmitted between the inner and outer rings through one roller of each pair of rollers, and the rotation in the opposite direction can be transmitted between the inner and outer rings through the other roller of each pair of rollers. Thus, it is not necessary to circumferentially move the roller retainer relative to one of the inner and outer rings that is formed with the cam surfaces in order to change the direction of rotation to be transmitted between the inner and outer rings.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENTS

Figure 1:
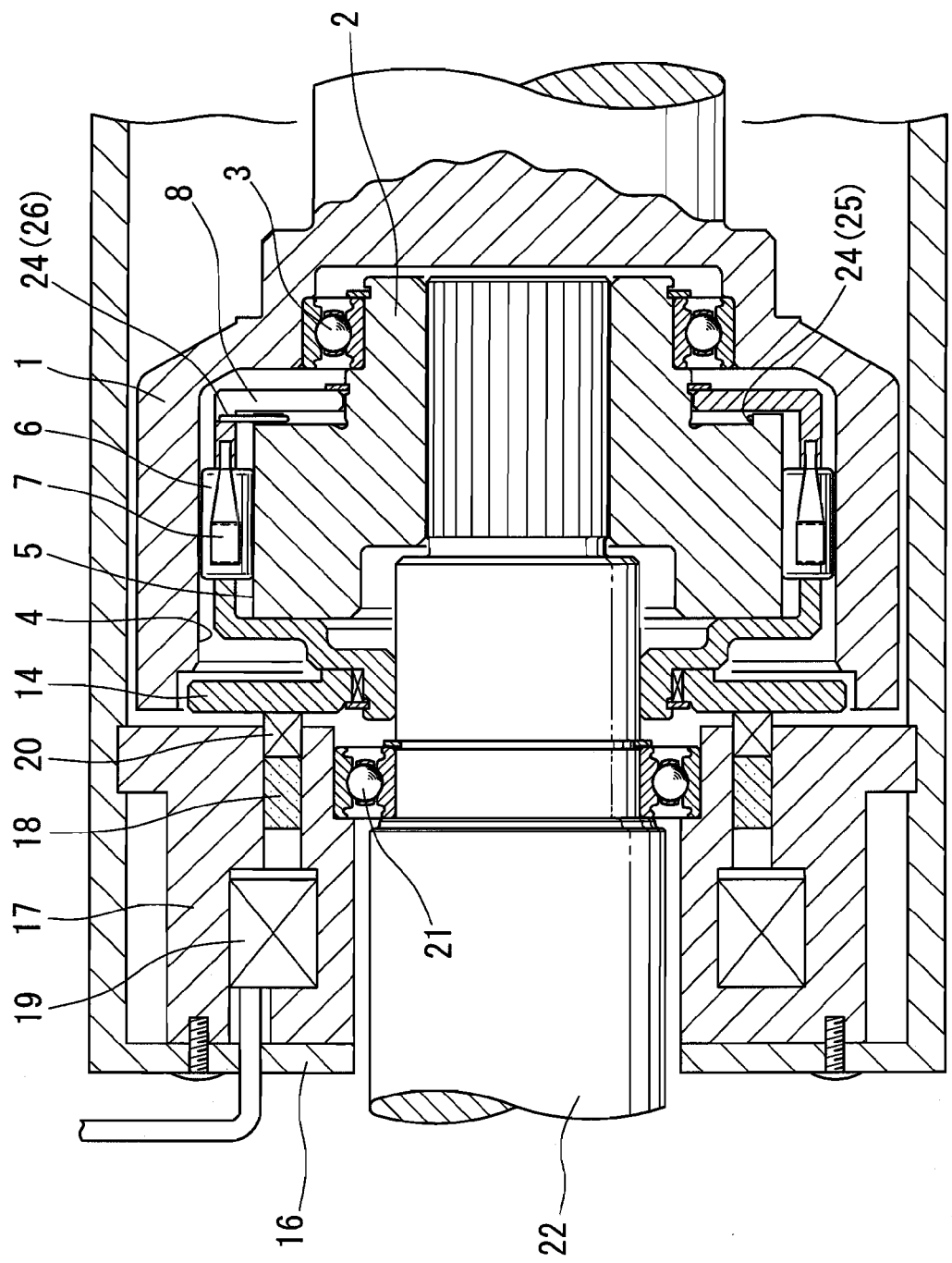
FIG. 1 is a sectional view of a rotation transmission device according to a first embodiment of the present invention.
Figure 2:
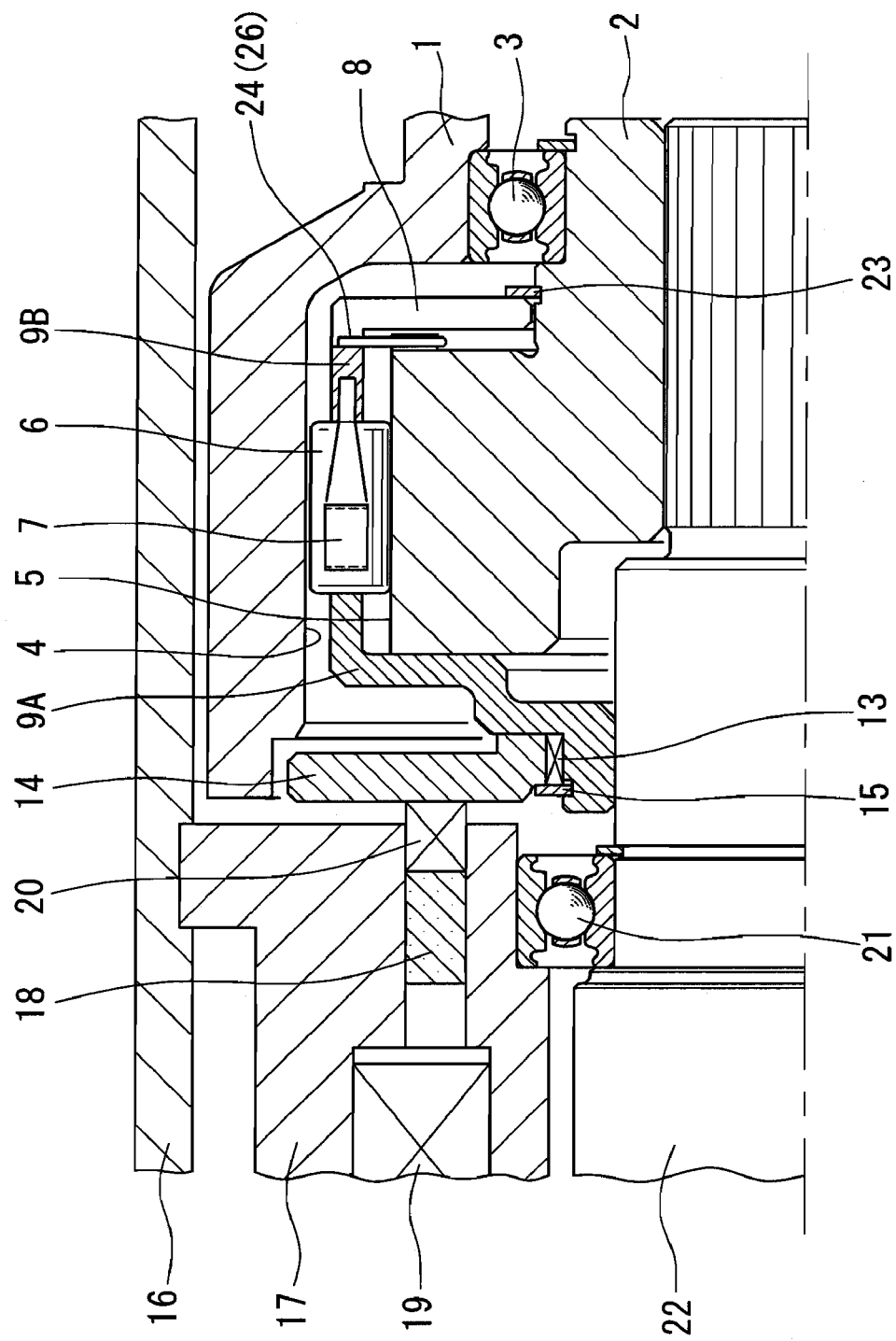
FIG. 2 is an enlarged sectional view of the rotation transmission device of FIG. 1, showing its portion including a roller retainer.
Figure 3:
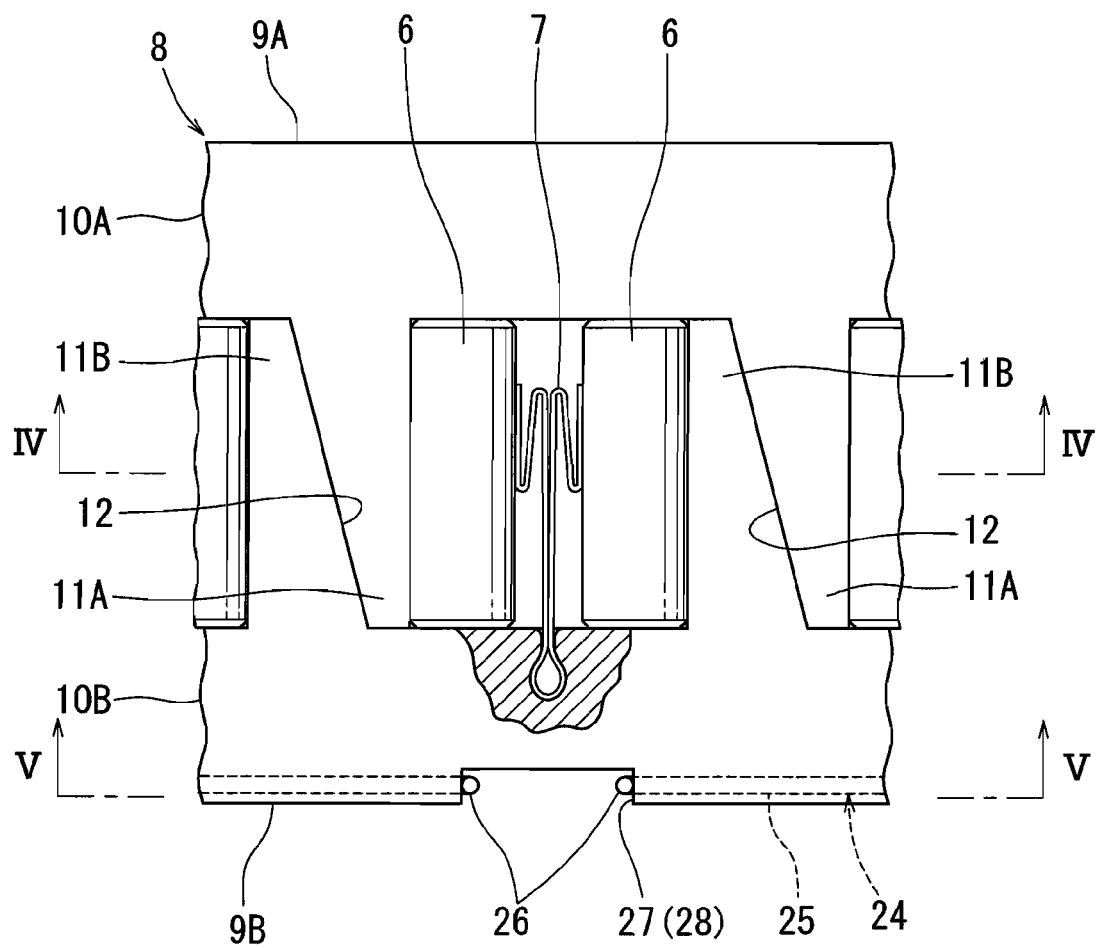
FIG. 3 is a developed view of FIG. 2, showing its portion including rollers.
Figure 4:
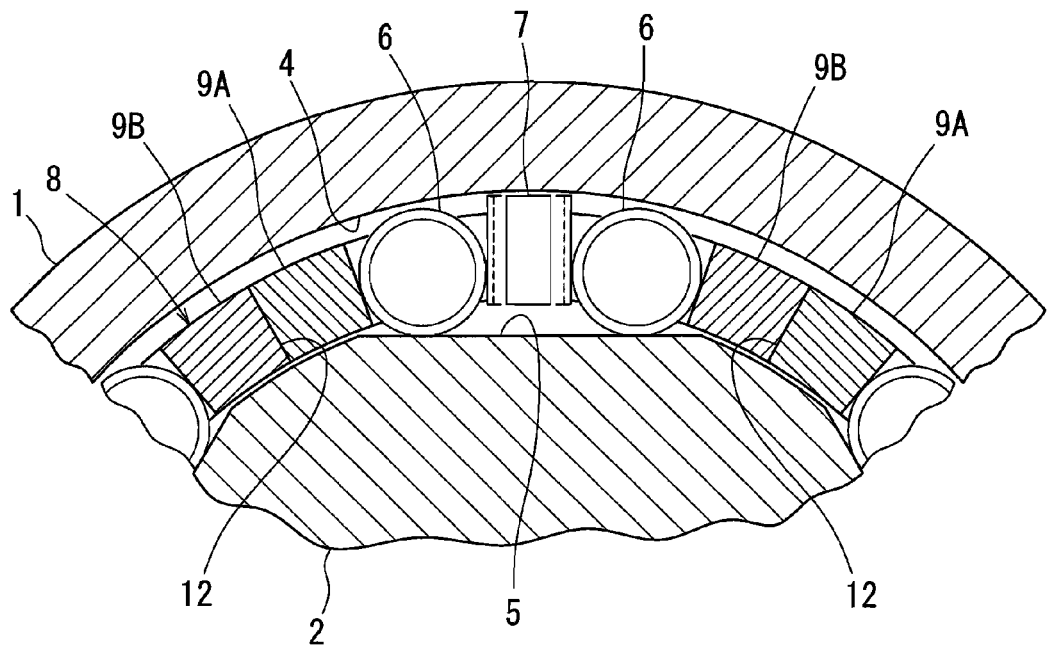
FIG. 4 is a sectional view taken along line IV-IV of FIG. 3.

Now referring to FIGS. 1 to 5, the rotation transmission device of the first embodiment includes, as shown in FIGS. 1 and 2, an inner ring 2 and an outer ring 1 which is rotatably supported on the inner ring 2 through a rolling bearing 3 provided around the inner ring 2. As shown in FIG. 4, a cylindrical surface 4 is formed on the inner periphery of the outer ring 1, and cam surfaces 5 are formed on the outer periphery of the inner ring 2 to define wedge spaces in cooperation with the cylindrical surface 4. Each wedge space has a radial width that gradually decreases from its circumferential central portion to circumferential ends.

As shown in FIGS. 3 and 4, a pair of circumferentially opposed rollers 6 are disposed between each cam surface 5 and the cylindrical surface 4. A roller separation spring 7 is disposed between the rollers of the pair of rollers 6 to bias the rollers 6 circumferentially away from each other. A roller retainer 8 keeps constant the distance between the rollers of each pair of rollers 6.

The roller retainer 8 comprises a pair of annular retainer members 9A and 9B which are circumferentially and axially movable relative to each other. The annular retainer member 9A comprises a cylindrical portion 10A and a plurality of protrusions 11A axially extending from the cylindrical portion 10A and circumferentially spaced from each other. Similarly, the annular retainer member 9B comprises a cylindrical portion 10B and a plurality of protrusions 11B axially extending from the cylindrical portion 10B and circumferentially spaced from each other. The protrusions 11A each have a side contact surface 12 that is in contact with a side contact surface 12 of the adjacent protrusion 11B. The rollers of each pair of rollers 6 are disposed in a space defined by two adjacent protrusions 11A and 11B with one roller of the pair of rollers 6 supported by the protrusion 11A and the other roller supported by the protrusion 11B.

The contact surfaces 12 are inclined relative to the axis of the roller retainer 8 so that when the annular retainer members 9A and 9B are moved axially relative to each other, the annular retainer members 9A and 9B also move circumferentially relative to each other with the side contact surfaces 12 of one of the annular retainer members 9A and 9B guided by the side contact surfaces of the other of the annular retainer members 9A and 9B. Thus, by axially moving the annular retainer members 9A and 9B relative to each other, the relative position between the annular retainer members 9A and 9B changes circumferentially in proportion to the relative axial movement of the retainer members 9A and 9B, so that the distance between the rollers of each pair of rollers 6 also changes.

As shown in FIG. 2, a slide bearing 13 is mounted on the outer periphery of the annular retainer member 9A at its axially outer end to rotatably support an annular armature 14. The armature 14 is prevented from axial movement relative to the annular retainer member 9A by a snap ring 15 fitted on the outer periphery of the annular retainer member 9A.

The armature 14 is made of a magnetic material (such as iron). The armature 14 is axially opposed to a field core 17 fixed to a case 16. A permanent magnet 18 is embedded in the field core 17. Also, an electromagnetic coil 19 is wound on the field core 17. The magnetic field produced by energizing the electromagnetic coil 19 is adapted to cancel the magnetic field produced from the permanent magnet 18. The field core 17 is provided with an armature separation spring 20 biasing the armature 14 away from the field core 17.

A rolling bearing 21 is mounted on the inner periphery of the field core 17 to rotatably support a rotary shaft 22. The rotary shaft 22 is formed with splines on its outer periphery at one end which engage splines formed on the inner periphery of the inner ring 2 so that the inner ring 2 is rotationally fixed to the rotary shaft 22.

Figure 5:
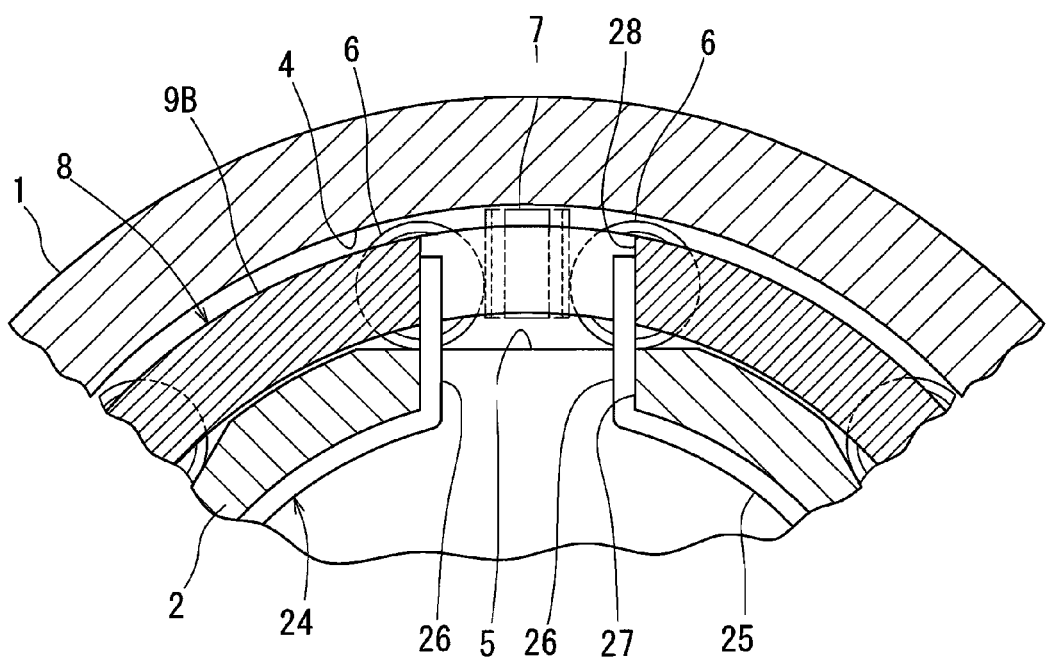
FIG. 5 is a sectional view taken along line V-V of FIG. 3.

The annular retainer member 9B is prevented from axial movement relative to the inner ring 1 by a snap ring 23 fitted on the outer periphery of the inner ring 1. As shown in FIG. 5, the annular retainer member 9B is elastically and circumferentially held in position relative to the inner ring 2 by a switch spring 24. The switch spring 24 comprises a C-shaped annular portion 25 and engaging portions 26 radially outwardly extending from the respective ends of the C-shaped annular portion 25. The engaging portions 26 are in engagement with one and the other of circumferentially opposed end walls of each of a cutout 27 formed in the inner ring 2 and a cutout 28 formed in the annular retainer member 9B, respectively.

Figure 6:
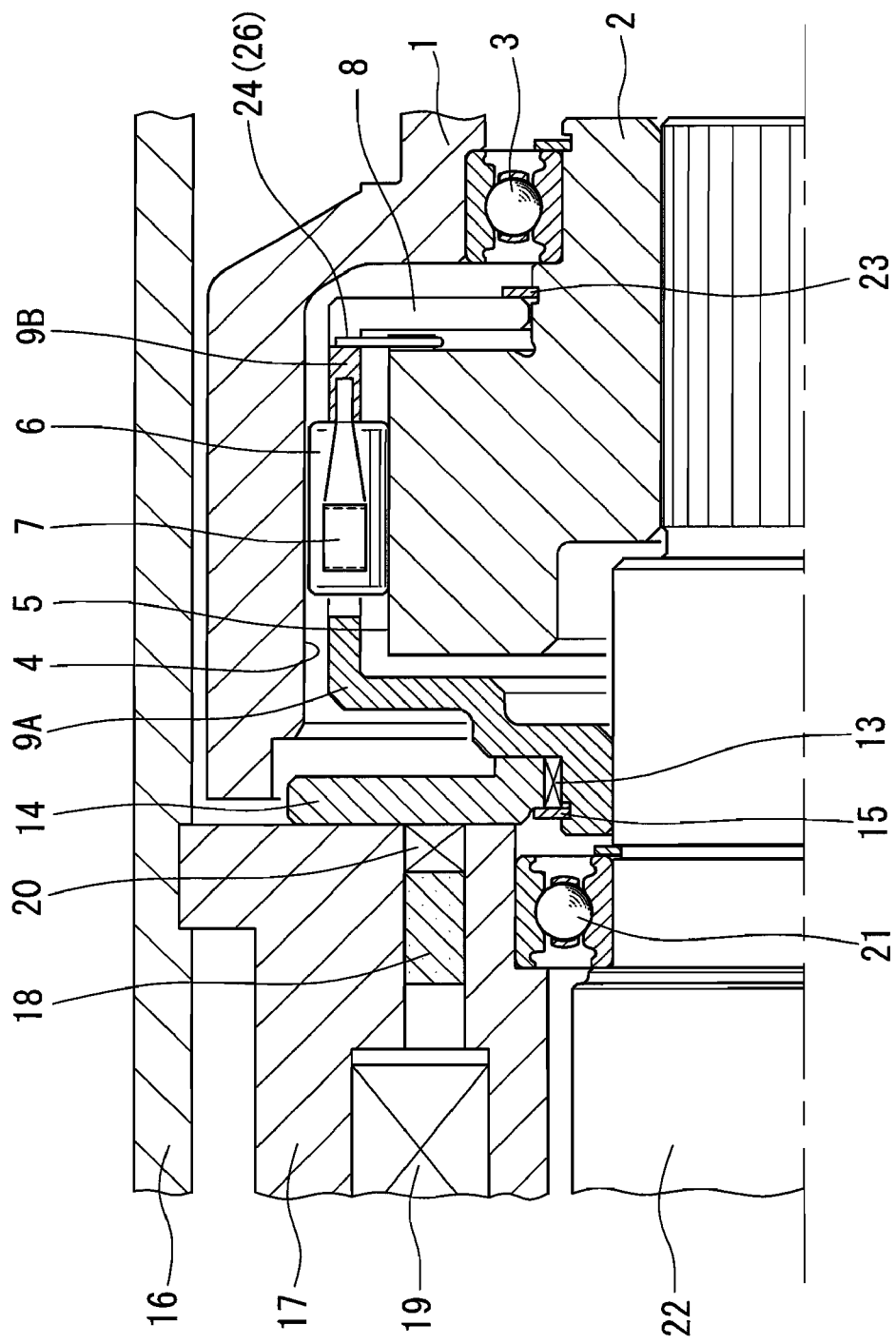
FIG. 6 is an enlarged sectional view similar to FIG. 2 when the electromagnetic coil is deenergized.
Figure 7:
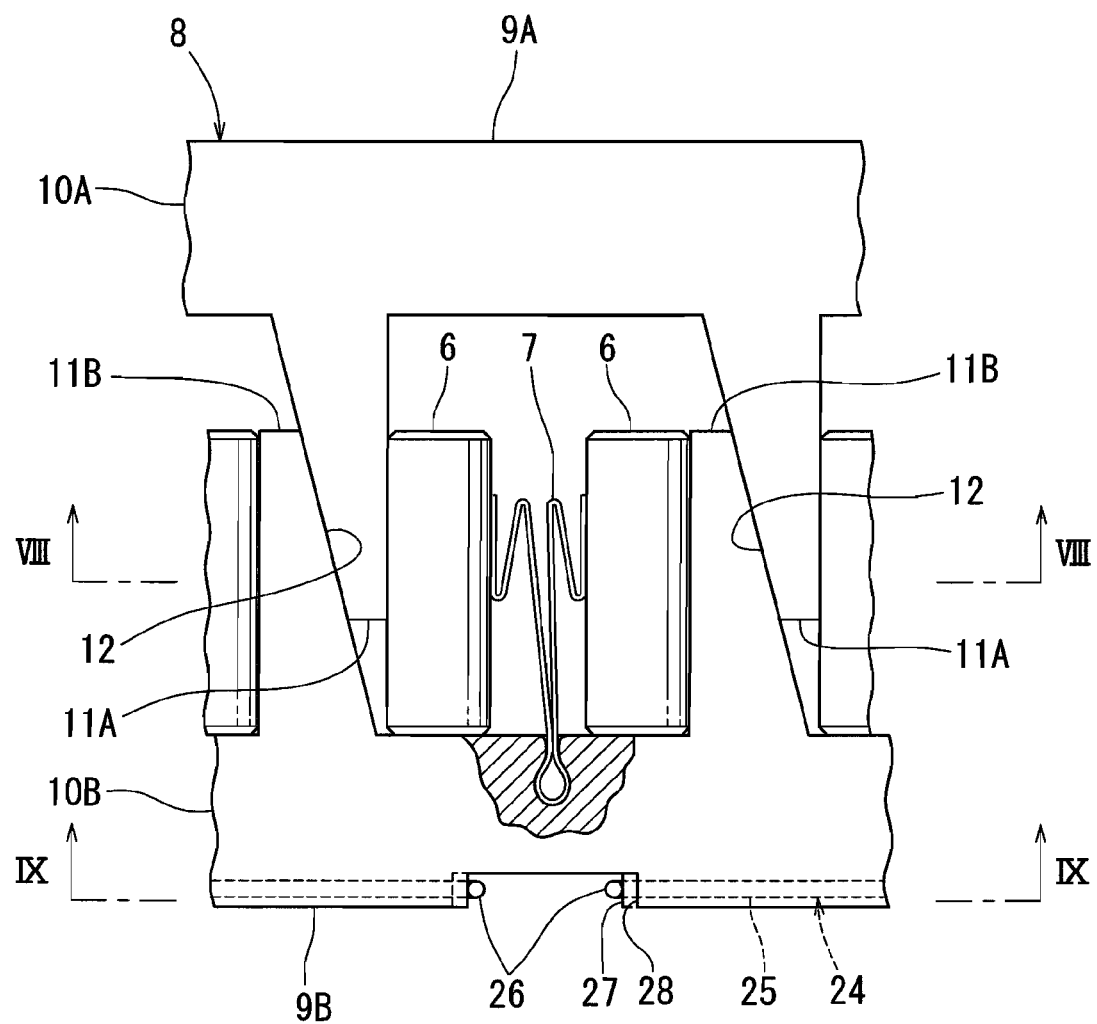
FIG. 7 is a developed view of FIG. 6, showing its portion including rollers.
Figure 8:
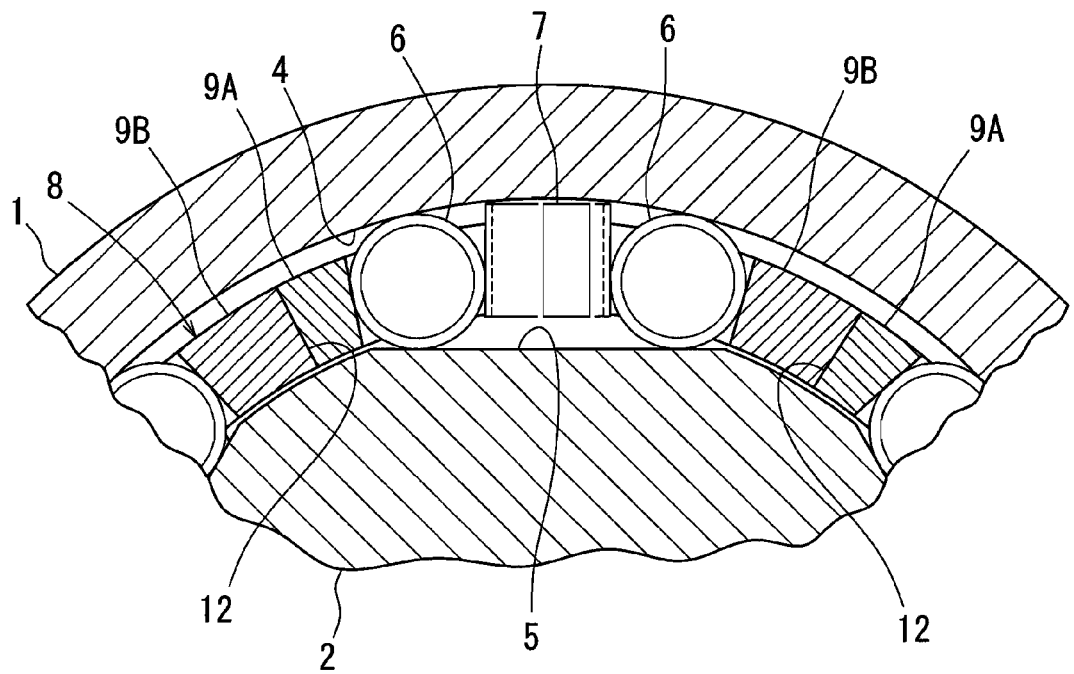
FIG. 8 is a sectional view taken along line VIII-VIII of FIG. 7.
Figure 9:
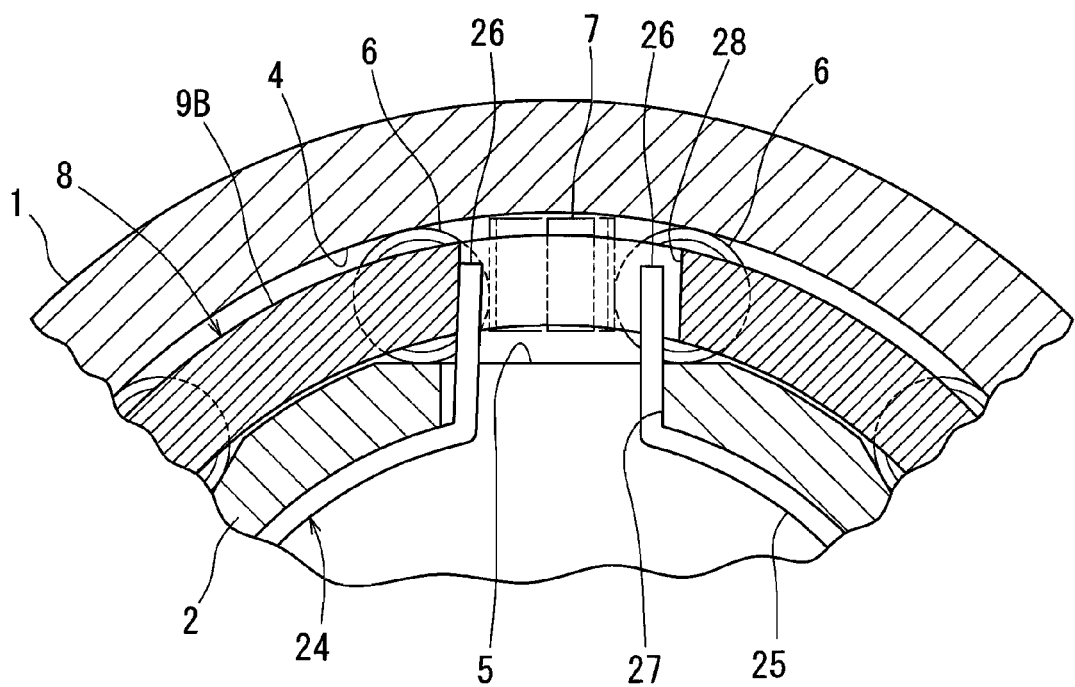
FIG. 9 is a sectional view taken along line IX-IX of FIG. 7.

The operation of this rotation transmission device is now described. When the electromagnetic coil 19 is deenergized, as shown in FIG. 6, the armature 14 is pulled by the magnetic attraction force of the permanent magnet 18 until the armature 14 abuts the field core 17, so that the annular retainer member 9A is moved in a direction away from the annular retainer member 9B. As a result, as shown in FIG. 7, the rollers 6 of each pair of rollers 6 are moved away from each other under the force of the roller separation spring 7, so that their distance increases. Thus, the rollers 6 are wedged between the cam surfaces 5 and the cylindrical surface 4 as shown in FIG. 8. Also, because the annular retainer member 9B moves circumferentially relative to the inner ring 2, the switch spring 24 is elastically deformed as shown in FIG. 9.

When the electromagnetic coil 19 is energized, the magnetic field produced from the electromagnetic coil 19 cancel the magnetic field of the permanent magnet 18, thus allowing the armature 14 to move away from the field core 17 under the force of the armature separation spring 20, so that the annular retainer member 9A moves toward the annular retainer member 9B. When the member 9A moves toward the member 9B, the annular retainer members 9A and 9B are circumferentially moved relative to each while being guided along their contact surfaces 12 in such a direction that the spaces between the circumferentially adjacent protrusions 11A and 11B in which the rollers 6 are disposed decreases. The distance between the rollers of each pair of rollers 6 thus decreases. Also, the annular retainer member 9B is circumferentially moved under the elastic restoring force of the switch spring 24 until the rollers 6 disengage from the cam surfaces 5 and the cylindrical surface 4.

In this arrangement, with both rollers of each pair of circumferentially opposed rollers 6 wedged between the cam surface 5 and the cylindrical surface 4 by increasing the distance therebetween, it is possible to transmit rotation in one direction between the inner and outer rings 2 and 1 through one roller of each pair of rollers 6 and rotation in the opposite direction through the other roller of each pair of rollers 6. Thus, it is not necessary to circumferentially move the roller retainer 8 when the direction in which rotation is transmitted between the inner and outer rings changes, so that the direction of transmission of rotation can be changed without a delay in response.

Also, with the rollers 6 disengaged from the cam surfaces 5 and the cylindrical surface 4, a space is reliably left between the rollers 6 and the cylindrical surface 4, so that the rollers are less likely to be untimely wedged between the cam surfaces 5 and the cylindrical surface 4. Therefore, the rotation transmission device according to this invention operates extremely stably.

Because rotation is transmitted between the inner and outer rings 2 and 1 through as many rollers 6 as the cam surfaces 5, a large turning torque can be transmitted between the inner and outer rings.

Also, when compared to the rotation transmission device disclosed in JP patent publication 2003-262238A, this rotation transmission device is less expensive because it is not necessary to provide a rotor that rotates together with the outer ring 1 between the armature 14 and the field core 17.

Figure 10:
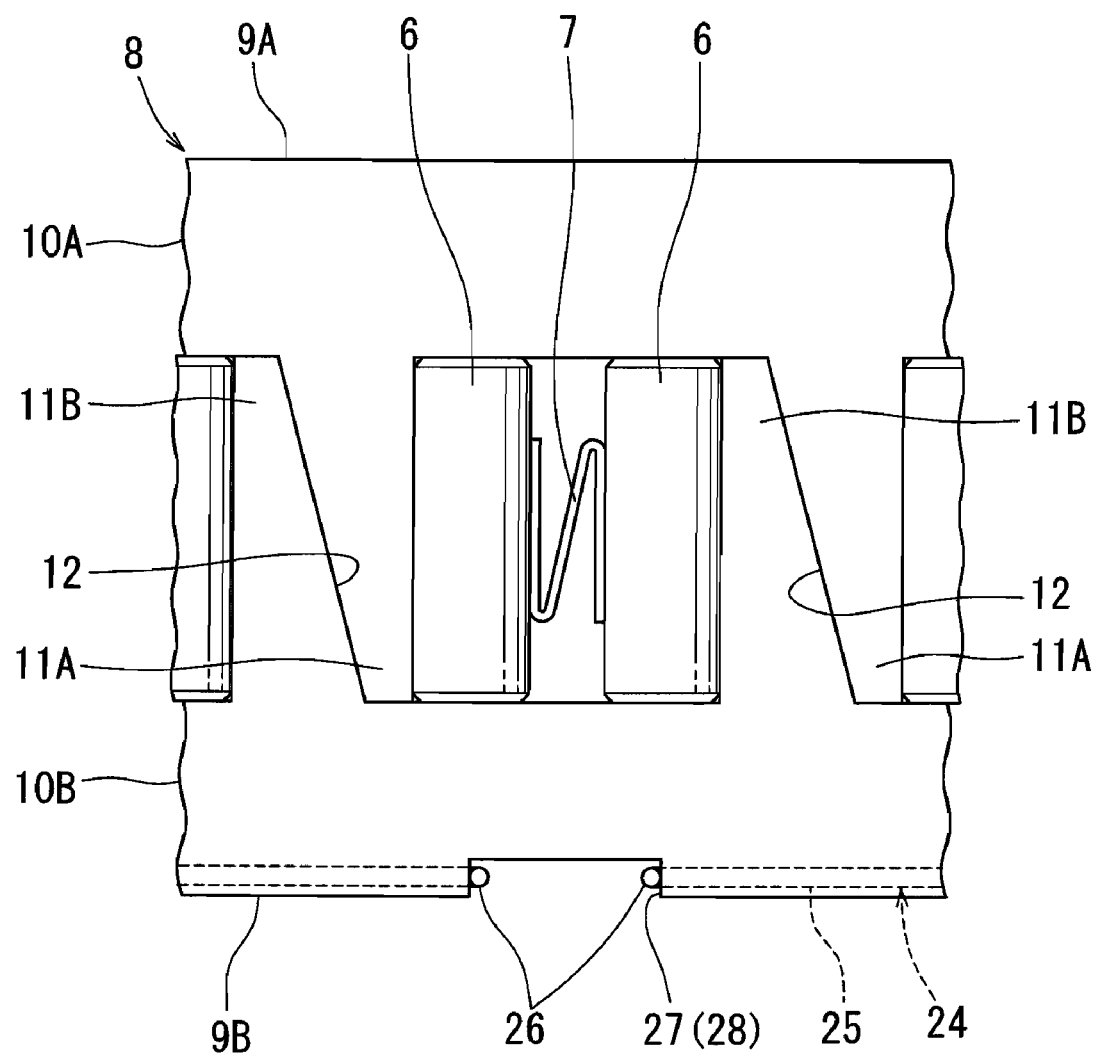
FIG. 10 is a developed view similar to FIG. 3 showing different roller separation springs.

In this embodiment, as shown in FIG. 3, the roller separation springs 7 are retained by the annular retainer member 9B to stabilize the attitude of the roller separation springs 7. But instead, as shown in FIG. 10, the roller separation springs 7 may be provided separately from the roller retainer 8.

Figure 11:
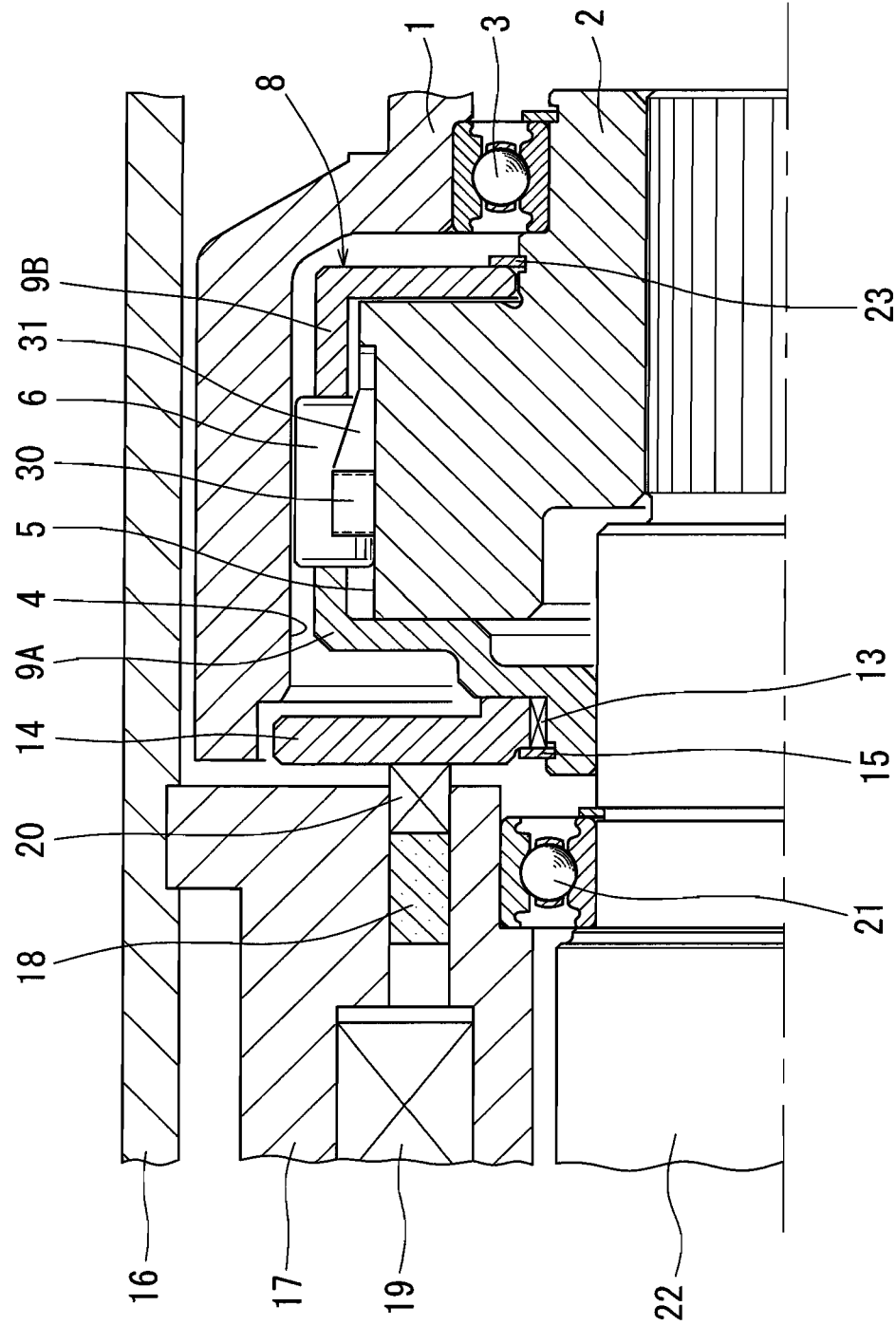
FIG. 11 is an enlarged sectional view of a rotation transmission device according to a second embodiment of the invention, showing its portion including the roller retainer.
Figure 12:
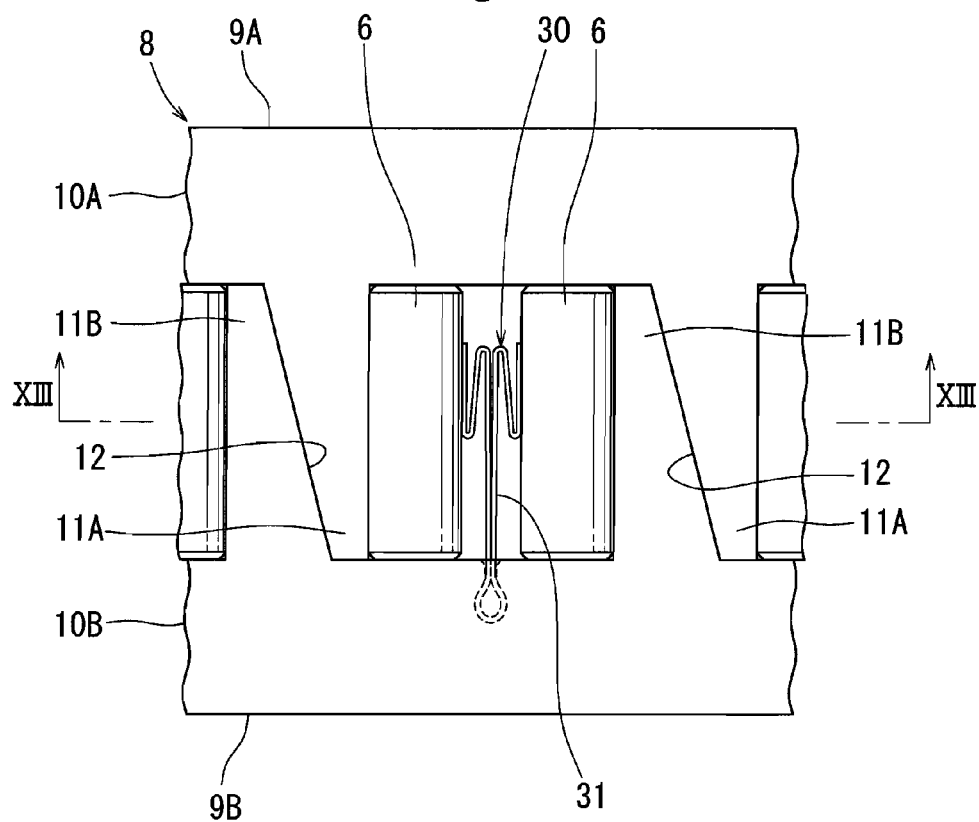
FIG. 12 is a developed view of FIG. 11, showing its portion including rollers.
Figure 13:
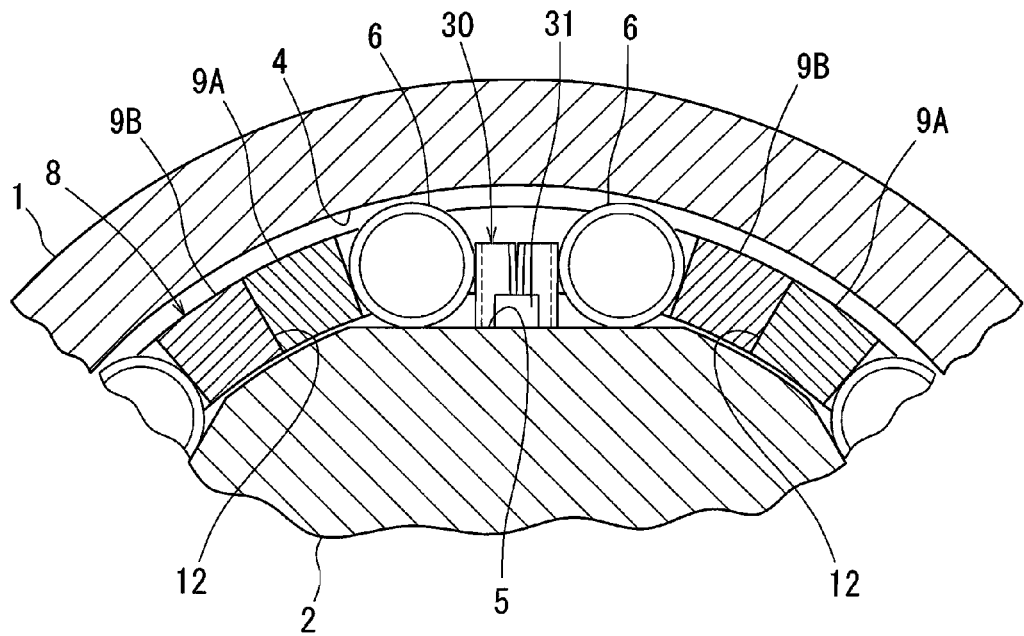
FIG. 13 is a sectional view taken along line XIII-XIII of FIG. 12.

FIGS. 11 to 13 show a rotation transmission device according to the second embodiment of this invention. In this embodiment, the switch spring 24 of the first embodiment is omitted, and instead, the roller separation springs are fixed to the inner ring 2. Thus, elements similar to or identical to those of the first embodiment are denoted by identical numerals and their description is omitted.

Figure 14:
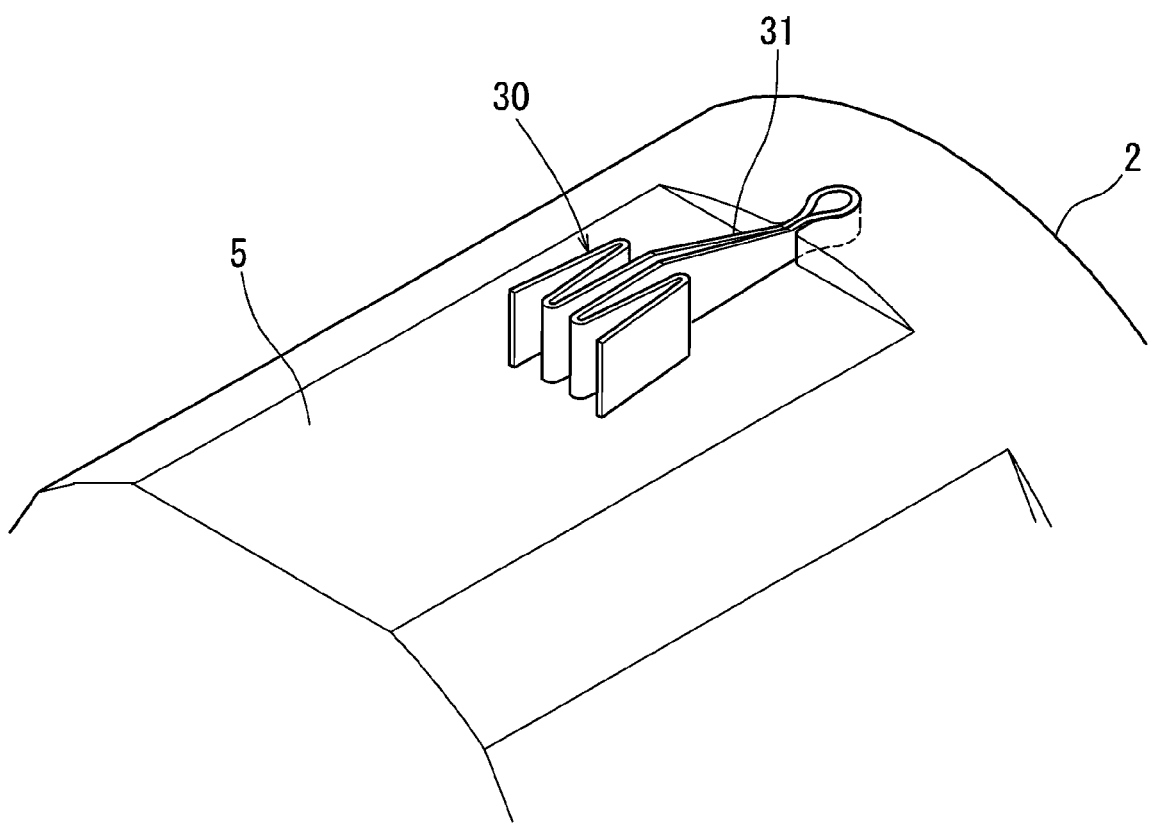
FIG. 14 is a perspective view of an inner ring and a roller separation spring of FIG. 12.

As shown in FIGS. 12 and 13, the rollers 6 of each pair of circumferentially opposed rollers 6 are biased away from each other by a roller separation spring 30 disposed between the rollers of each pair of rollers 6. The roller separation springs 30 are circumferentially shrinkable corrugated leaf springs. As shown in FIG. 14, each spring 30 includes an extension 31 protruding axially from the circumferential central portion of the spring 30 and having its tip fixed to the inner ring 2 at its portion corresponding to the circumferential central portion of one of the cam surfaces 5.

Figure 15:
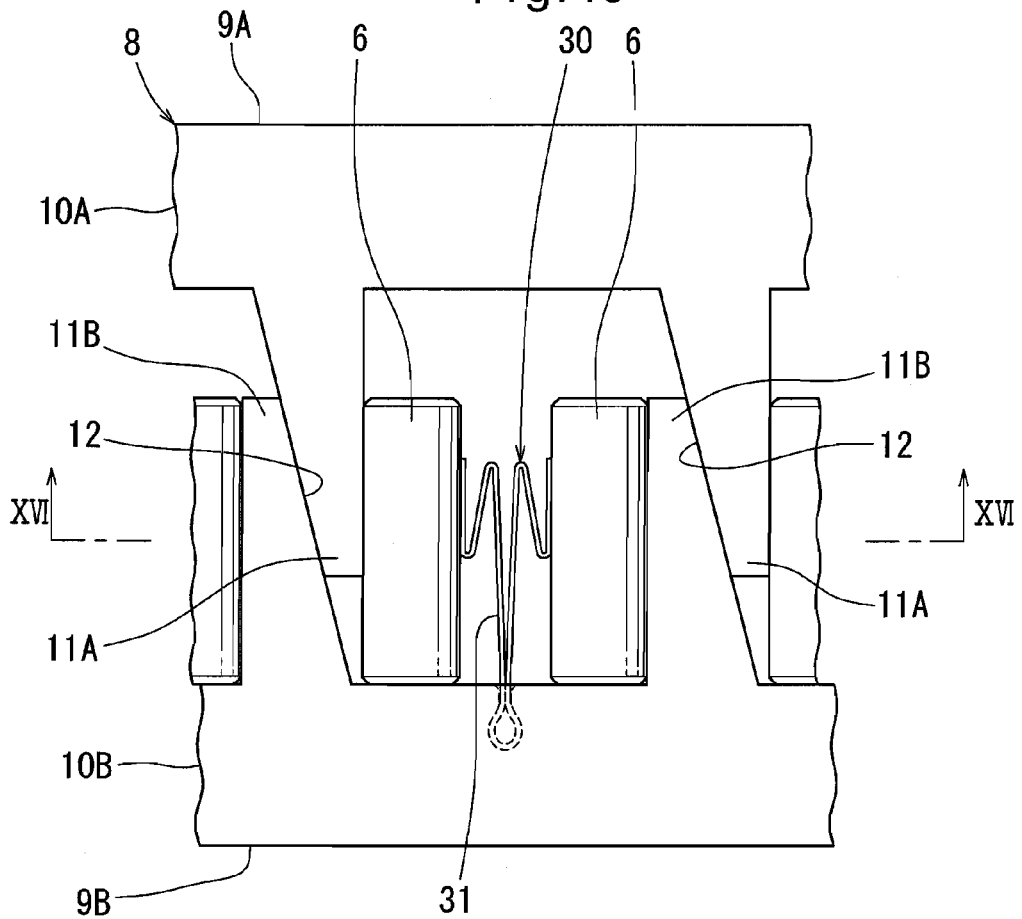
FIG. 15 is a developed view of the rotation transmission device showing its portion including rollers when an electromagnetic coil of FIG. 11 is deenergized.
Figure 16:
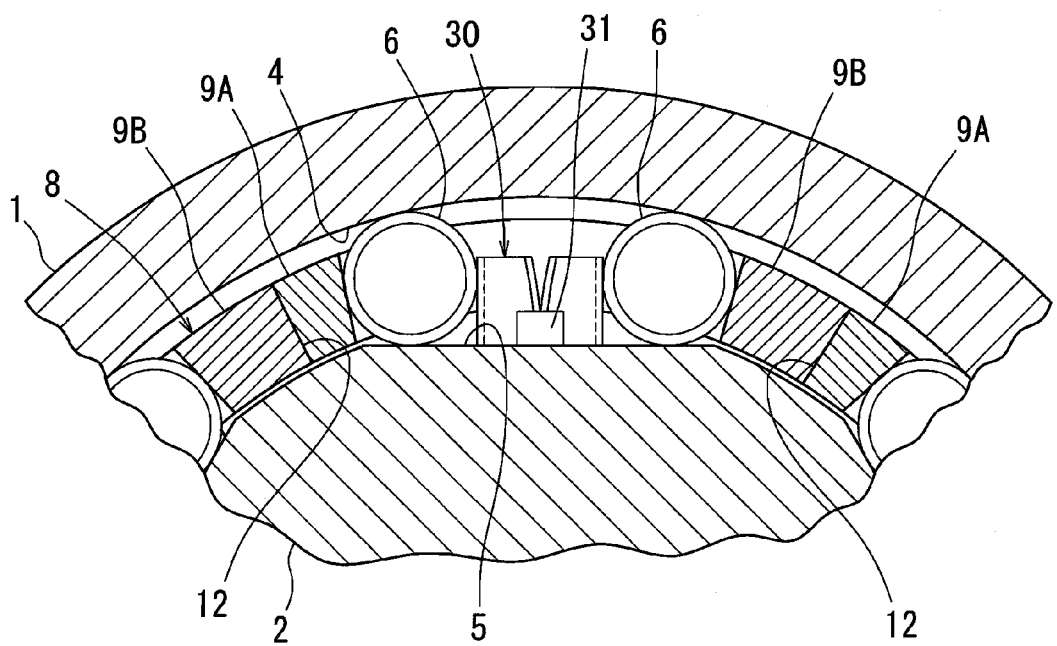
FIG. 16 is a sectional view taken along line XVI-XVI of FIG. 15.

The operation of this rotation transmission device is now described. When the electromagnetic coil 19 is deenergized, the annular retainer member 9A is pulled by the magnetic attraction force of the permanent magnet 18 away from the annular retainer member 9B. As a result, as shown in FIG. 15, the rollers 6 of each pair of rollers 6 are moved away from each other under the force of the roller separation spring 30, so that their distance increases. Thus, the rollers 6 are wedged between the cam surfaces 5 and the cylindrical surface 4 as shown in FIG. 16.

When the electromagnetic coil 19 is energized, the annular retainer member 9A is moved toward the annular retainer member 9B under the biasing force of the armature separation spring 20. Thus, the distance between the rollers 6 of each pair of rollers 6 decreases as shown in FIG. 12. At this time, because the extension 31 of each roller separation spring 30 is fixed to the inner ring 2 at its portion corresponding to the circumferential central portion of the cam surface 5, the distance between the rollers of each pair of rollers 6 decreases while being positioned so as to be symmetrical with respect to the circumferential center of the cam surface 5. Both rollers of each pair of rollers 6 thus disengage from the cam surfaces 5 and the cylindrical surface 4.

In this arrangement, with both rollers of each pair of circumferentially opposed rollers 6 wedged between the cam surface 5 and the cylindrical surface 4 by increasing the distance therebetween, it is possible to transmit rotation in one direction between the inner and outer rings 2 and 1 through one roller of each pair of rollers 6 and rotation in the opposite direction through the other roller of each pair of rollers 6. Thus, it is not necessary to circumferentially move the roller retainer 8 when the direction in which rotation is transmitted between the inner and outer rings changes, so that the direction of transmission of rotation can be changed without a delay in response.

In this embodiment, because the roller separation springs 30 are fixed to the inner ring, it is possible to omit the switch spring 24 used in the first embodiment, so that the rotation transmission device of this embodiment is more economical.

Figure 17:
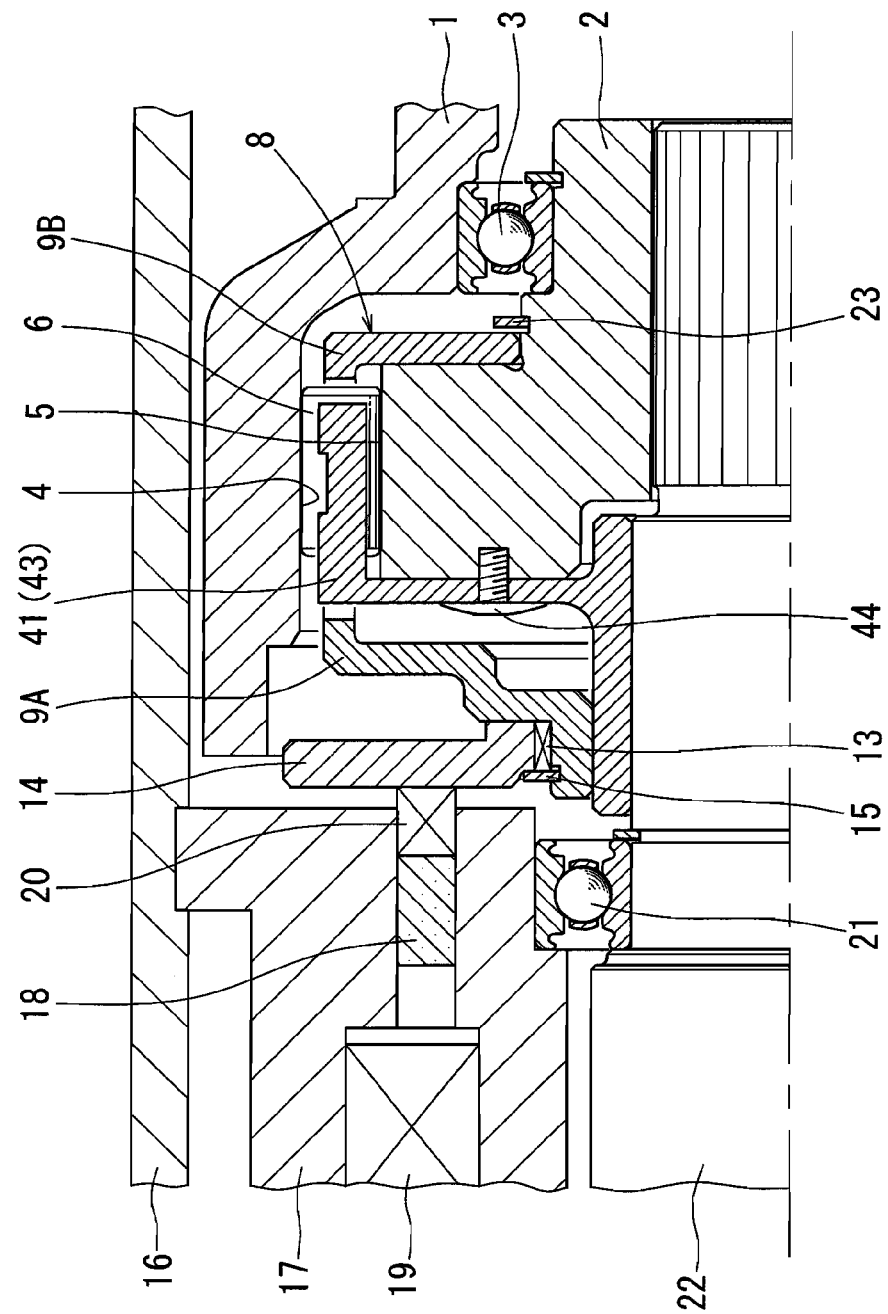
FIG. 17 is an enlarged sectional view of a rotation transmission device according to a third embodiment of the invention, showing its portion including a roller retainer.
Figure 18:
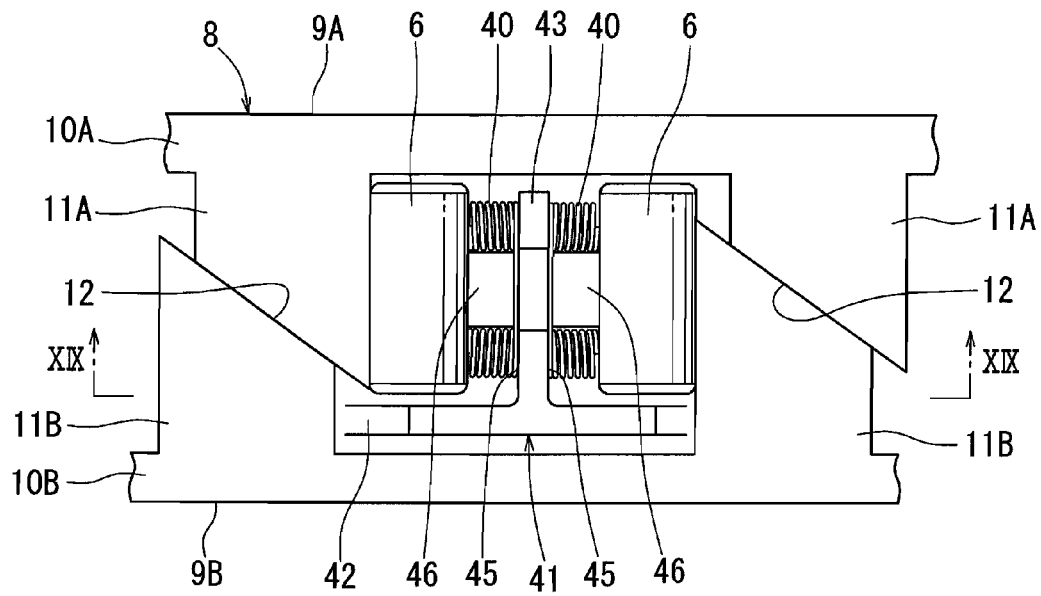
FIG. 18 is a developed view of FIG. 17 showing rollers.
Figure 19:
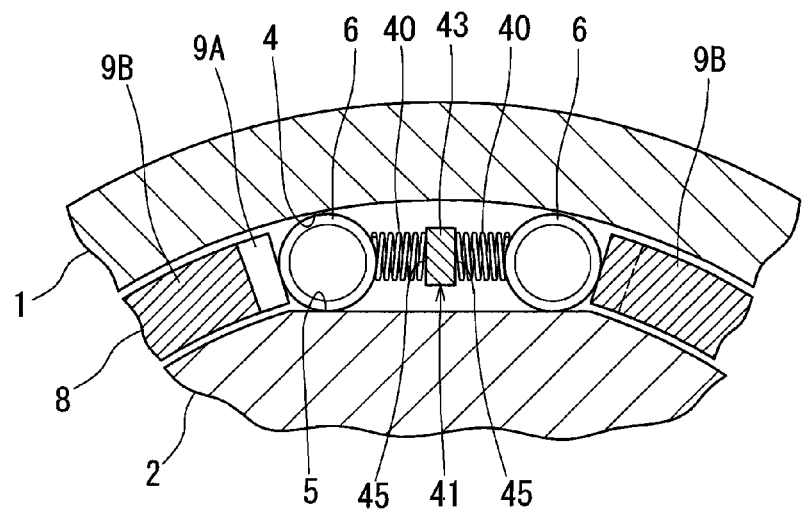
FIG. 19 is a sectional view taken along line XIX-XIX of FIG. 18.

FIGS. 17 to 19 show the rotation transmission device according to the third embodiment of the invention. In this embodiment, elements corresponding to those of the first embodiment are denoted by identical numerals and their description is omitted.

In this embodiment, as shown in FIGS. 18 and 19, a pair of roller separation springs 40 are disposed between each pair of circumferentially opposed rollers 6 to bias the rollers of the pair of rollers 6 away from each other. The roller separation springs 40 are held in position by a spring retainer 41.

Figure 20:
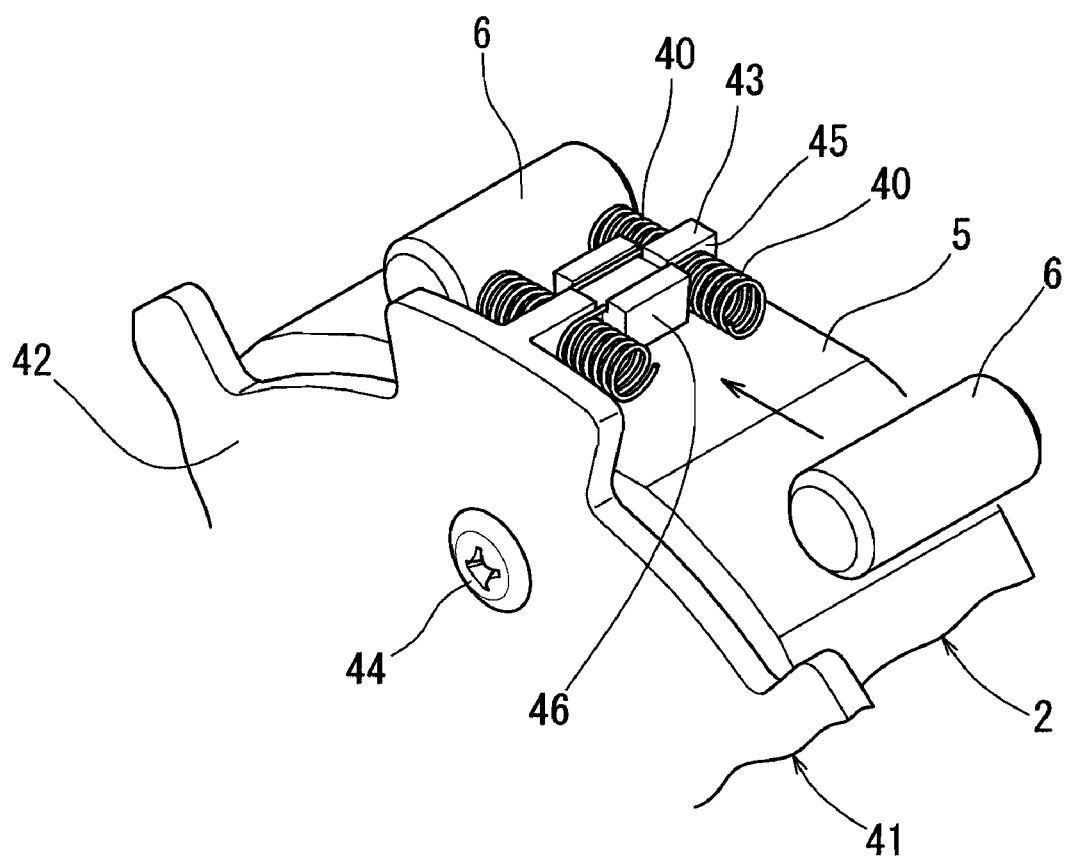
FIG. 20 is a perspective view of an inner ring, rollers, roller separation springs, and a spring retainer of FIG. 18.

As shown in FIG. 20, the spring retainer 41 includes a flange 42 and bridges 43 axially extending from the flange 42. The flange 42 is fixed to one axial end surface of the inner ring 2 by screws 44. As shown in FIG. 18, the bridges 43 are inserted between the rollers of the respective pairs of circumferentially opposed rollers 6, thereby supporting the respective roller separation springs 40 on their surfaces 45 opposed to the rollers 6. Each roller separation spring 40 comprises a pair of parallel coil springs having one end of one of the coil springs coupled to one end of the other coil spring, and simultaneously biases one and the other ends of the corresponding roller 6. Each bridge 43 has roller stoppers 46 protruding from the surfaces 45 opposed to the respective rollers 6.

Figure 21:
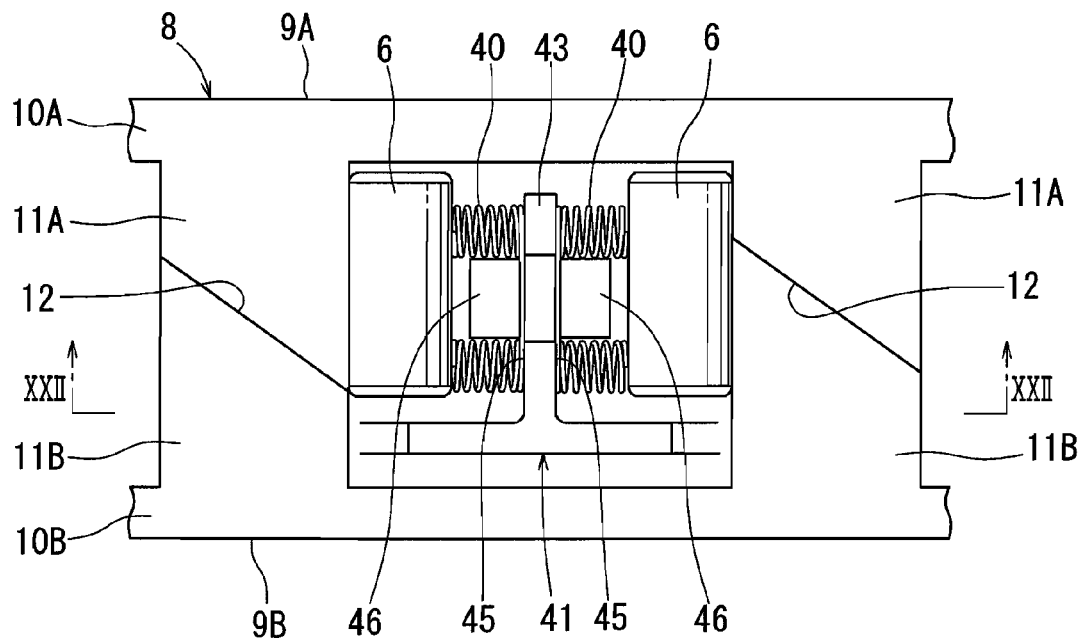
FIG. 21 is a developed view showing rollers when the electromagnetic coil of FIG. 17 is deenergized.
Figure 22:
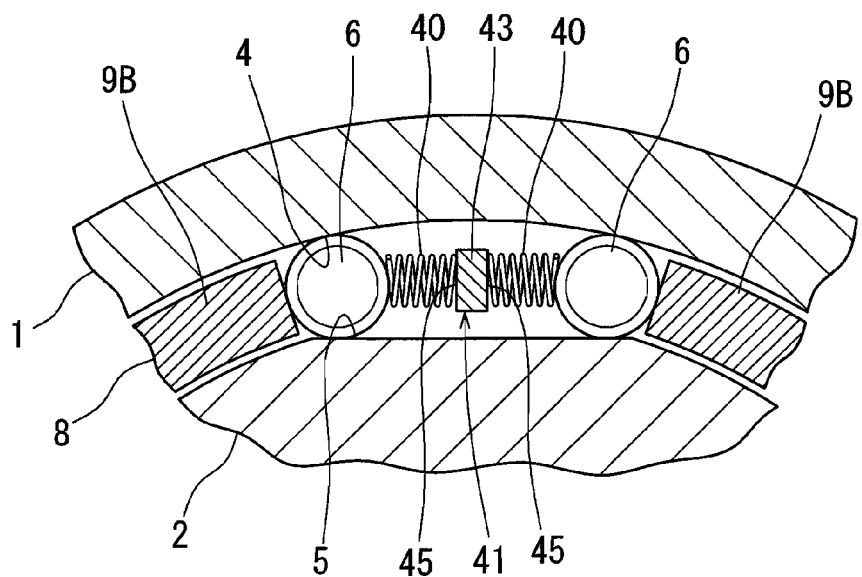
FIG. 22 is a sectional view taken along line XXII-XXII of FIG. 21.

The operation of this rotation transmission device is now described. When the electromagnetic coil 19 is deenergized, the annular retainer member 9A is moved away from the annular retainer member 9B under the magnetic attraction force of the permanent magnet 18, so that the rollers of each pair of rollers 6 are moved away from each other under the force of the roller separation springs 40 and thus the distance therebetween increases as shown in FIG. 21. Thus, as shown in FIG. 22, the rollers 6 are wedged between the cam surfaces 5 and the cylindrical surface 4.

When the electromagnetic coil 19 is energized, the annular retainer member 9A is moved toward the annular retainer member 9B under the force of the armature separation spring 20. When the member 9A moves toward the member 9B, as shown in FIG. 18, the annular retainer members 9A and 9B are circumferentially moved relative to each other while being guided along the contact surfaces 12 of the protrusions 11A and 11B in such a direction that the spaces between the circumferentially adjacent protrusions 11A and 11B in which the rollers 6 are disposed decreases. The distance between the rollers of each pair of rollers 6 thus decreases. Also, because the roller separation springs 40 are fixed to the inner ring 2 through the spring retainer 41, as shown in FIG. 19, the distance between the rollers of each pair of rollers 6 decreases while being positioned so as to be symmetrical with respect to the circumferential center of the cam surface 5. The rollers 6 thus disengage from the cam surfaces 5 and the cylindrical surface 4.

At this time, as shown in FIG. 18, the roller stoppers 46 of the bridges 43 engage the respective rollers 6, so that the rollers 6 are always spaced from the respective bridges 43. This prevents breakage of the roller separation springs 40.

In this embodiment too, as in the first embodiment, with both rollers of each pair of circumferentially opposed rollers 6 wedged between the cam surface 5 and the cylindrical surface 4 by increasing the distance therebetween, it is possible to transmit rotation in either direction between the inner and outer rings. Thus, it is not necessary to circumferentially move the roller retainer 8 when the direction in which rotation is transmitted between the inner and outer rings changes, so that the direction of transmission of rotation can be changed without a delay in response.

Figure 23:
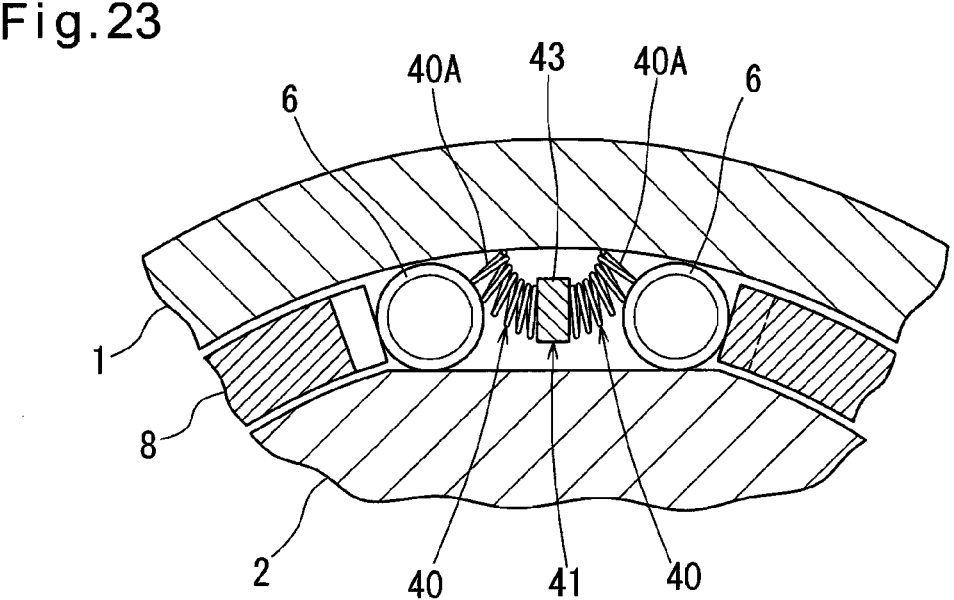
FIG. 23 is a sectional view similar to FIG. 19 showing how a roller separation spring is buckled at its portions in contact with outer peripheries of rollers.
Figure 24:
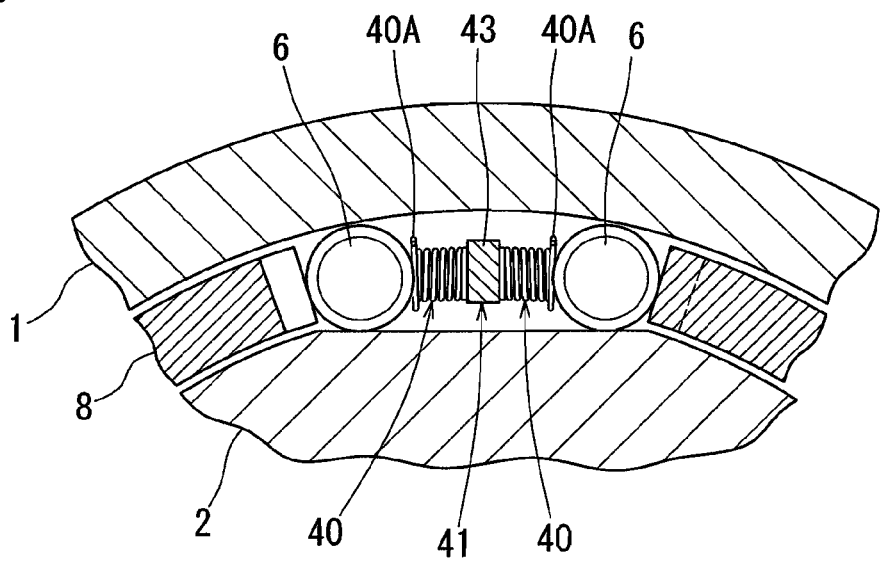
FIG. 24 is a sectional view similar to FIG. 19 showing a different roller separation spring.
Figure 25:
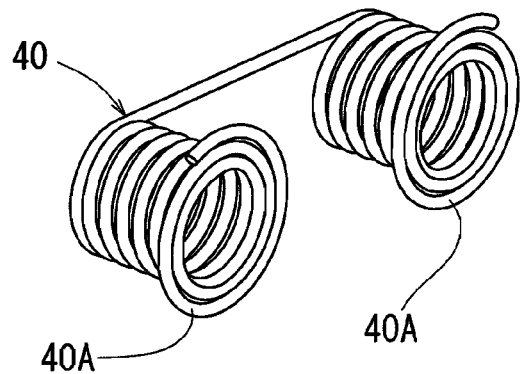
FIG. 25 is an enlarged perspective view of a roller separation spring of FIG. 24.

Generally, coil springs are less likely to suffer permanent strain compared to leaf springs. Thus, roller separation springs 40 of this embodiment, which are coil springs, are more durable than the roller separation springs 7 of the first embodiment, which are leaf springs. But as shown in FIG. 23, the roller separation springs 40 may buckle at their roller contact portions 40A that are in contact with the rollers 6, thus destabilizing the biasing force applied to the rollers 6 from the springs 40. Thus, as shown in FIGS. 24 and 25, the roller contact portions 40A preferably have the shape of a flange having an increased diameter to prevent the buckling of the roller contact portions 40A, thereby stabilizing the biasing force applied to the rollers 6 from the roller separation springs 40.

Figure 26A:
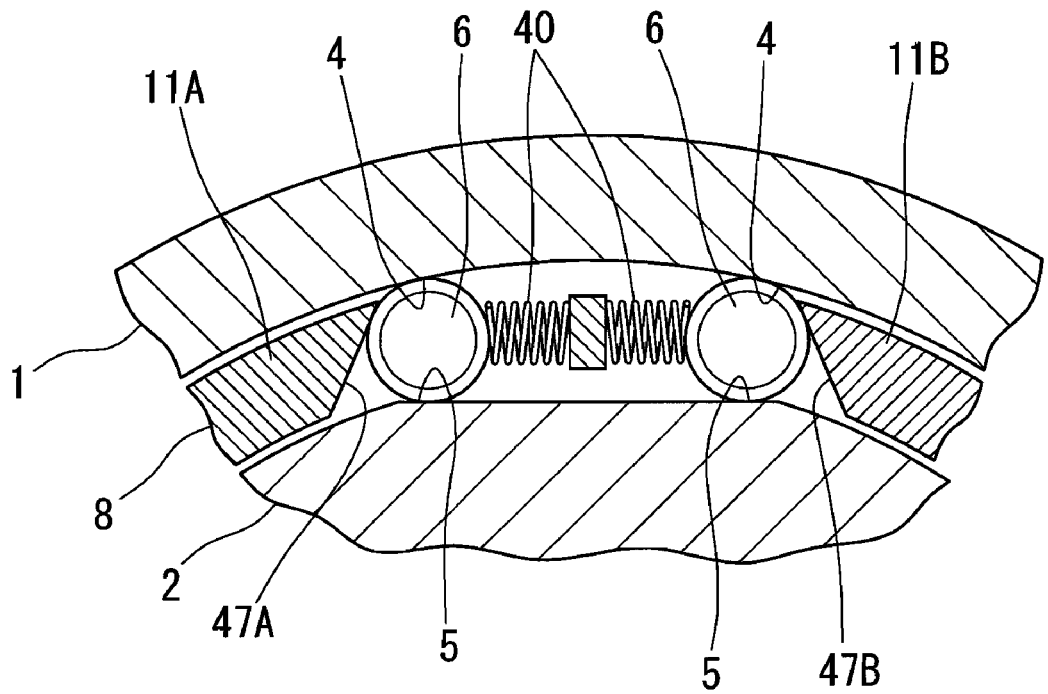
FIG. 26A is a sectional view similar to FIG. 22 showing different protrusions of annular retainer members.
Figure 26B:
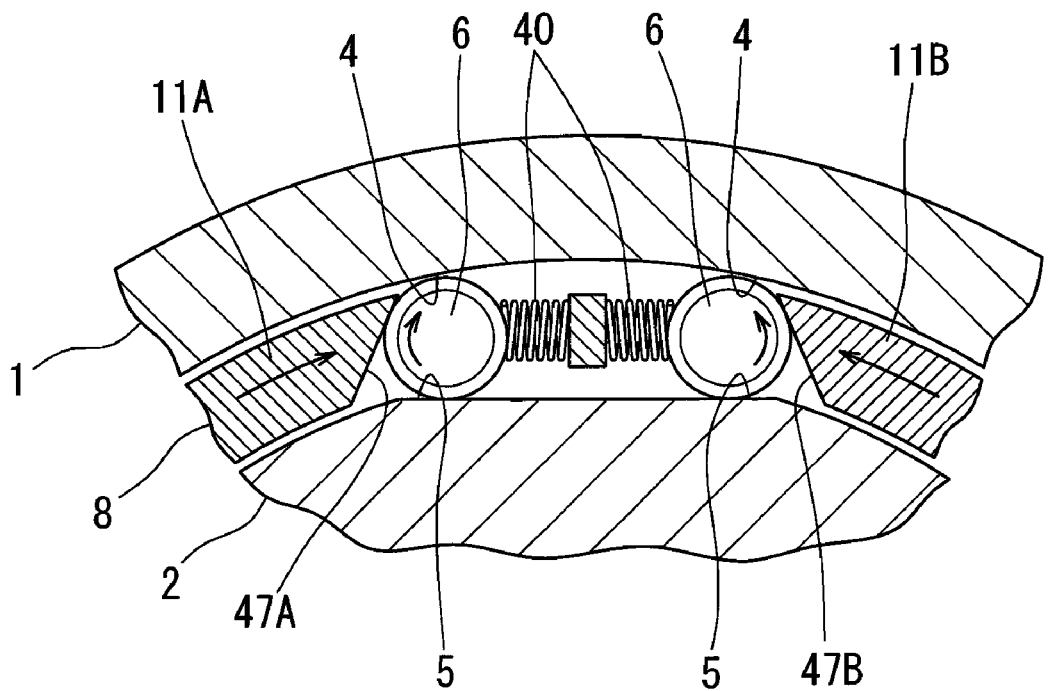
FIG. 26B shows how the rollers are disengaged by pushing the rollers with the protrusions of FIG. 26A.

As shown in FIG. 26A, side walls 47A and 47B of the protrusions 11A and 11B which abut the rollers 6 are preferably inclined radially outwardly toward each other so that the rollers 6 each abut one of the side walls 47A and 47B at its portion that is spaced apart from the cam surface 5 by a greater distance than is its center. With this arrangement, as shown in FIG. 26B, when the rollers 6 are pushed by the protrusions 11A and 11B, the rollers 6 can roll on the cam surfaces 5, so that the rollers 6 can smoothly move on the cam surfaces. This in turn makes it possible to reduce the energy necessary to disengage the rollers 6.

Figure 27:
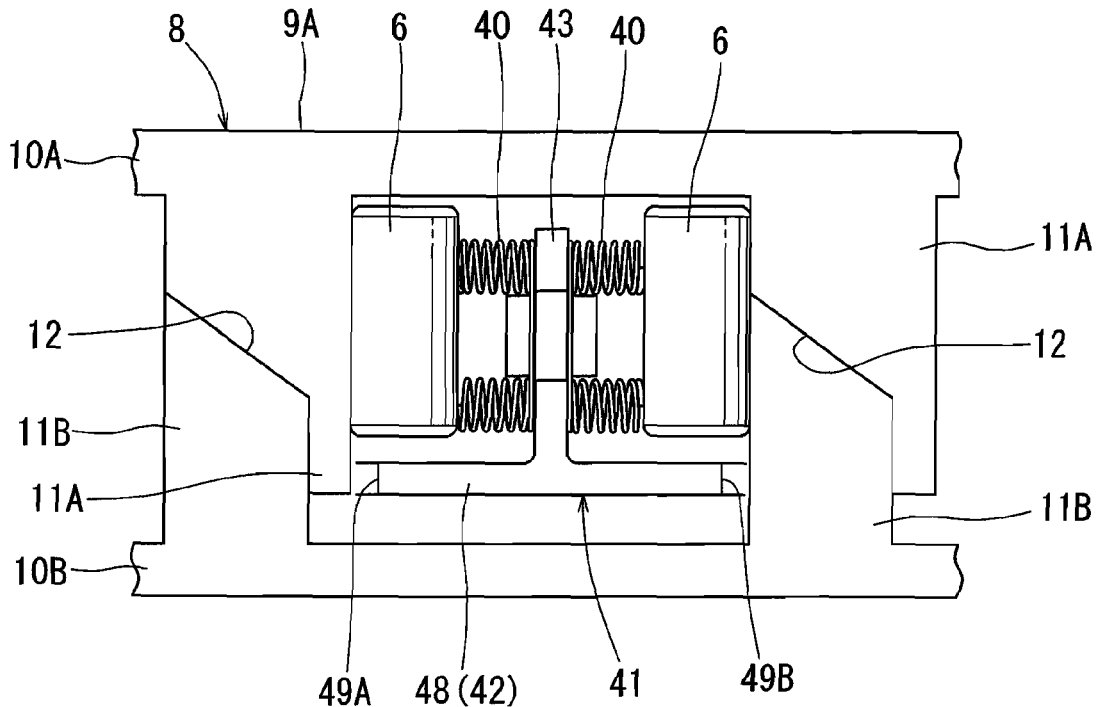
FIG. 27 is a developed view similar to FIG. 21 showing a different roller retainer and spring retainer.
Figure 28:
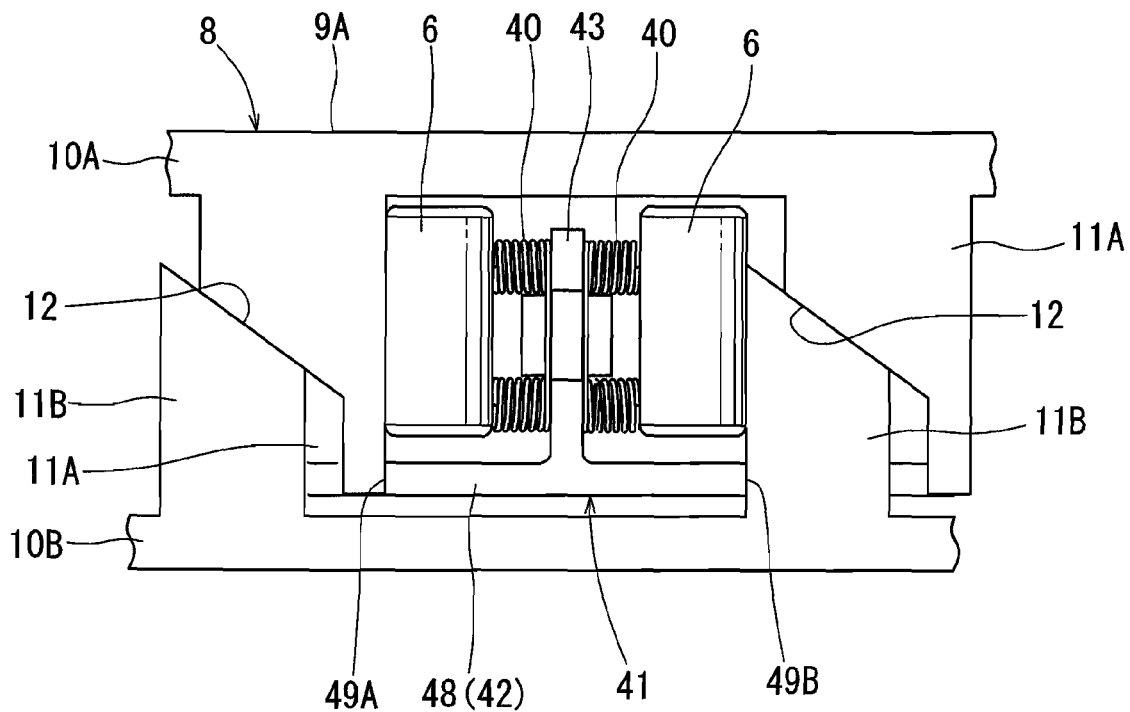
FIG. 28 is a developed view similar to FIG. 27 showing the state in which the distance between rollers is reduced by moving the annular retainer members of FIG. 27 relative to each other.

Preferably, as shown in FIG. 27, a retainer stopper 48 is integrally formed on the flange 42 of the spring retainer 41 and is disposed between a pair of circumferentially adjacent and spaced protrusions 11A and 11B with circumferential end surfaces 49A and 49B thereof in abutment with the protrusions 11A and 11B, respectively, so that the annular retainer members 9A and 9B are circumferentially positioned relative to the inner ring 2. With this arrangement, as shown in FIG. 28, when the protrusions 11A and 11B move in such a direction as to shorten the distance between the rollers of each pair of rollers 6, the pair of protrusions 11A and 11B abut the retainer stopper 48 at a position where each pair of rollers 6 are symmetrical with respect to the circumferential center of the cam surface 5. This prevents the rollers 6 from being untimely wedged between the cam surfaces 5 and the cylindrical surface 4.

In any of the above-described embodiments, by providing the permanent magnet 18 in the field core 17, the armature 14 is attracted to the field core 17 when the electromagnetic coil 19 is deenergized. But the permanent magnet 18 in the field core 17 may be omitted to attract the armature 14 to the field core 17 when the electromagnetic coil 19 is energized.

Figure 29:
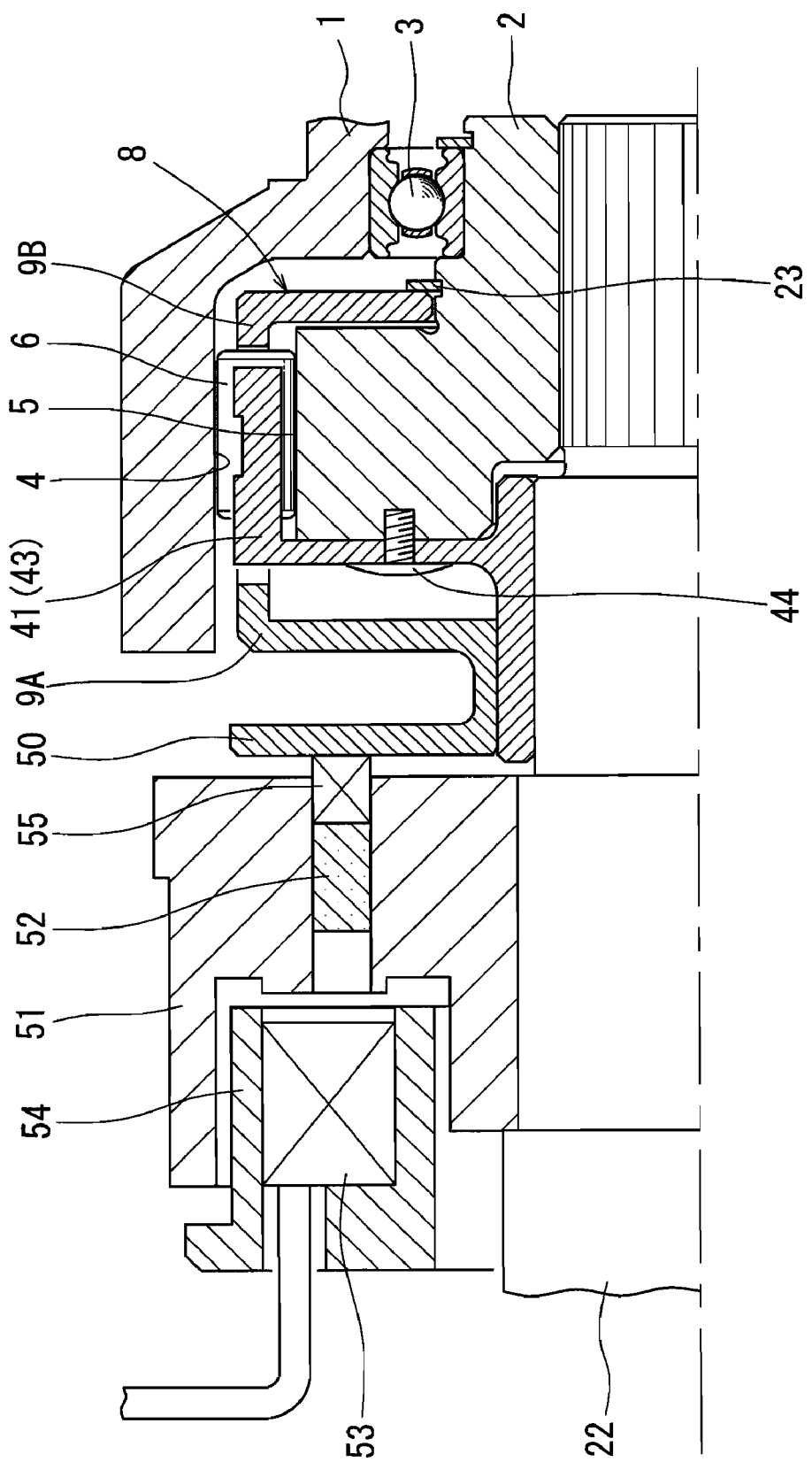
FIG. 29 is a enlarged sectional view of a rotation transmission device according to a fourth embodiment of the invention, showing its roller retainer.

FIG. 29 shows the rotation transmission device according to the fourth embodiment of the present invention. Elements similar to or identical to those of the third embodiment are denoted by identical numerals and their description is omitted.

At the axially outer end of the annular retainer member 9A, an annular armature 50 made of a magnetic material is integrally provided to axially oppose an annular rotor 51 fixed to the outer periphery of the rotary shaft 22. A permanent magnet 52 is embedded in the rotor 51. A field core 54 on which an electromagnetic coil 53 is wound is provided to axially face the armature 50 with the rotor 51 disposed between. The magnetic field produced by energizing the electromagnetic coil 53 cancels the magnetic field of the permanent magnet 52. An armature separation spring 55 is mounted to the rotor 51 to bias the armature 50 away from the rotor 51.

The operation of this rotation transmission device is now described. When the electromagnetic coil 53 is deenergized, the armature 50 is magnetically attracted by the permanent magnet 52 until it abuts the rotor 51, so that the annular retainer member 9A is moved away from the annular retainer member 9B. Thus, as in the third embodiment, the rollers of each pair of rollers 6 are both wedged between the cam surface 5 and the cylindrical surface 4.

When the electromagnetic coil 53 is energized, the annular retainer member 9A is moved toward the annular retainer member 9B under the force of the armature separation spring 55. Thus, as in the third embodiment, the rollers of each pair of rollers 6 both disengage from the cam surface 5 and the cylindrical surface 4.

In this embodiment too, as in the first embodiment, with both rollers of each pair of circumferentially opposed rollers 6 wedged between the cam surface 5 and the cylindrical surface 4 by increasing the distance therebetween, it is possible to transmit rotation in either direction between the inner and outer rings. Thus, the direction of transmission of rotation can be changed without a delay in response.

With this rotation transmission device, even when the armature 50 is moved away from the rotor 51, because the rotor 51 and the armature 50 are rotationally fixed to each other, no frictional resistance is produced therebetween. Thus, when compared to the third embodiment, when the rollers are not wedged between the cam surfaces 5 and the cylindrical surface 4, idling torque transmitted between the inner and outer rings 2 and 1 is small.

Figure 30:
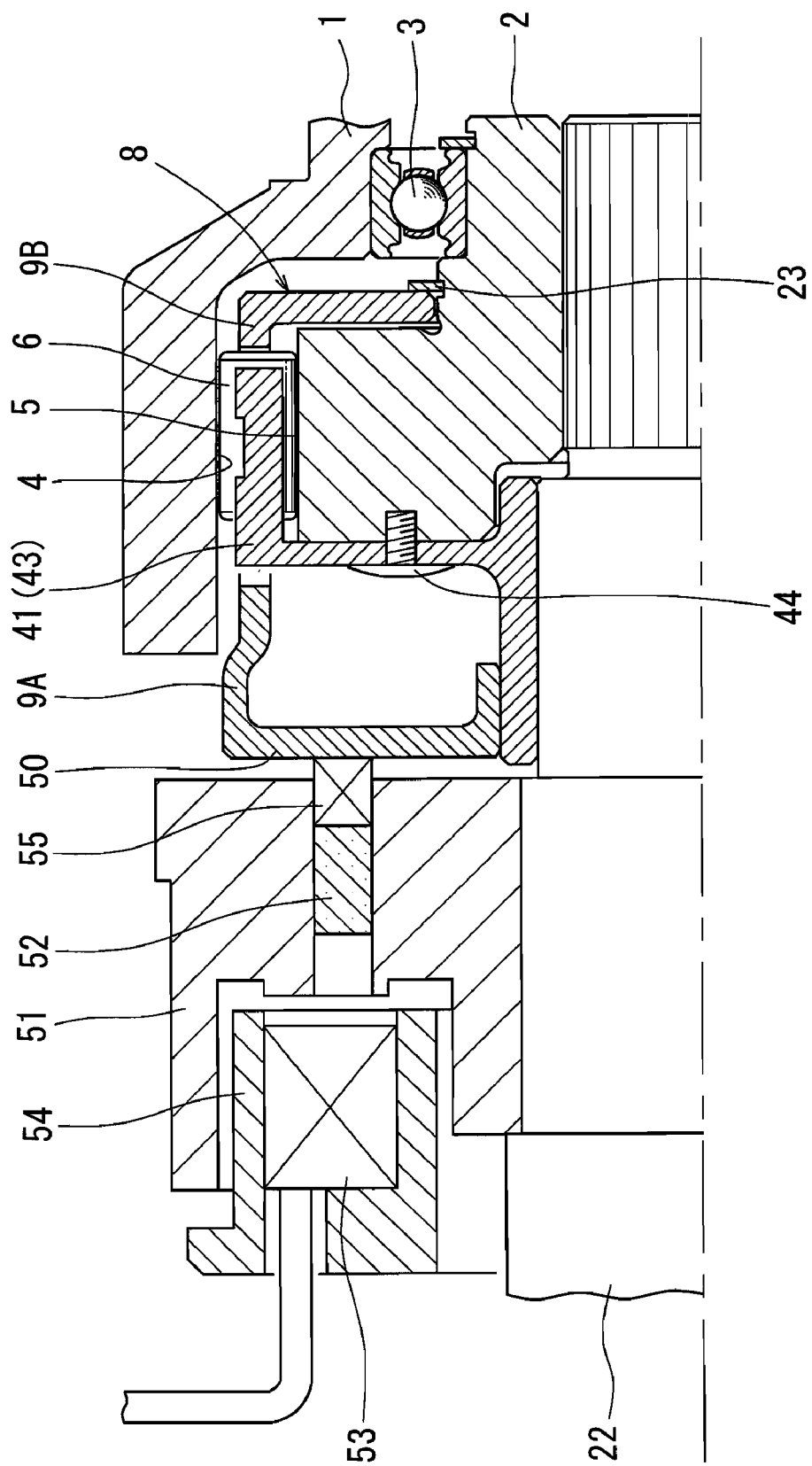
FIG. 30 is an enlarged sectional view similar to FIG. 29 showing a different armature.

In FIG. 29, the armature 50 is in the shape of a radially outwardly extending flange. But instead, the armature 50 may be in the shape of a radially inwardly extending flange as shown in FIG. 30.

In this embodiment, by providing the permanent magnet 52 in the rotor 51, when the electromagnetic coil 53 is deenergized, the armature 50 is attracted to the rotor 51. But the permanent magnet 52 may be omitted to attract the armature 50 to the rotor 51 when the electromagnetic coil 53 is energized.

In any of the above embodiments, an electromagnetic coil is used as an actuator for axially changing the relative position between the annular retainer members 9A and 9B. But a different type of actuator such as an electric motor, a hydraulic actuator or a pneumatic actuator may be used to change the relative axial positions of the annular retainer members 9A and 9B.

In any of the embodiments, the cylindrical surface 4 is formed on the inner periphery of the outer ring 1, and the cam surfaces 5 are formed on the outer periphery of the inner ring 2. But instead, the cam surfaces may be formed on the inner periphery of the outer ring 1 and the cylindrical surface may be formed on the outer periphery of the inner ring 2.

What is claimed is:

1. A rotation transmission device comprising an inner ring having an outer periphery, an outer ring having an inner periphery, one of said outer periphery and said inner periphery being formed with cam surfaces, and the other of said outer periphery and said inner periphery being formed with a cylindrical surface, a plurality of pairs of rollers, the rollers of each pair being disposed between one of said cam surfaces and said cylindrical surface to circumferentially face each other, roller separation springs each disposed between the rollers of one of said pairs of rollers to bias said rollers of each of said pairs of rollers away from each other until wedged between said one of said cam surfaces and said cylindrical surface, and a roller retainer retaining said rollers and capable of changing the distance between the rollers of each of said pairs of rollers, reducing the distance between the rollers of each of said pairs of rollers, whereby said rollers are disengageable from said cam surfaces and said cylindrical surface by reducing the circumferential distance between the rollers of each of said pairs of rollers with said roller, retainer, wherein said roller retainer comprises first and second annular retainer members that are circumferentially movable relative to each other, said first and second annular retainer members having first, axial protrusions and second axial protrusions, respectively, to support the rollers of each of said pairs of rollers with one of said first axial protrusions and one of said second axial protrusions that is adjacent to said one of said first axial protrusions, whereby the distance between the rollers of each of said pairs of rollers is changeable by circumferentially moving said first and second annular retainer members relative to each other, wherein said first and second annular retainer members are axially movable relative to each other, said first and second annular retainer members having first and second contact surfaces, respectively, that are in sliding contact with each other, said first and second contact surfaces being configured such that when said first and second annular retainer members move axially relative to each other with said first and second contact surfaces in sliding contact with each other, said first and second annular retainer members are also circumferentially moved relative to each other.

2. The rotation transmission device of claim 1 wherein said roller retainer is elastically retained by one of said inner ring and said outer ring that is formed with said cam surfaces.

3. The rotation transmission device of claim 1 wherein said roller separation springs are fixed to one of said inner ring and said outer ring that is formed with said cam surfaces.

4. The rotation transmission device of claim 3 further comprising a spring retainer for retaining said roller separation springs, said spring retainer being fixed to said one of said inner ring and said outer ring, thereby fixing said roller separation springs in position.

5. The rotation transmission device of claim 1 further comprising stoppers each disposed between the rollers of one of said plurality of pairs of rollers for restricting the minimum distance between the rollers of each of the pairs of rollers, thereby preventing breakage of said roller separation springs.

6. The rotation transmission device of claim 1 wherein said roller separation springs comprise coil springs having contact portions that are brought into contact with said respective rollers, said contact portions having an increased diameter.

7. The rotation transmission device of claim 1 wherein said first and second protrusions are in abutment with said respective rollers at portions that are spaced from said respective cam surfaces by a larger distance than are the centers of the respective rollers.

8. The rotation transmission device of claim 1 further comprising a retainer stopper disposed between one of said first axial protrusions and one of said second axial protrusions that is adjacent to said one of said first protrusions and fixed to one of said inner and outer rings that is formed with said cam surfaces, whereby said first and second annular retainer members are retained in position by bringing said first and second annular retainer members into abutment with said retainer stopper.

9. The rotation transmission device of claim 1 further comprising an annular armature made of a magnetic material and rotatably but axially immovably mounted on said first annular retainer member, a field core axially spaced from said armature, and an electromagnetic coil wound on said field core, whereby said first and second annular retainer members can be axially movable relative to each other by energizing said electromagnetic coil.

10. The rotation transmission device of claim 1 further comprising an annular armature made of a magnetic material and integrally formed on said first annular retainer member, an annular rotor rotationally fixed to one of said inner and outer rings that is formed with said cam surfaces and axially facing said armature, a field core axially facing said armature with said rotor disposed between, and an electromagnetic coil wound on said field core, whereby said first and second annular retainer members can be axially movable relative to each other by energizing said electromagnetic coil.

11. A rotation transmission device comprising an inner ring having an outer periphery, an outer ring having an inner periphery, one of said outer periphery and said inner periphery being formed with cam surfaces, and the other of said outer periphery and said inner periphery being formed with a cylindrical surface, a plurality of pairs of rollers, the rollers of each pair being disposed between one of said cam surfaces and said cylindrical surface to circumferentially face each other, roller separation springs each disposed between the rollers of one of said pairs of rollers to bias said rollers of each of said pairs of rollers away from each other until wedged between said one of said cam surfaces and said cylindrical surface, and a roller retainer retaining said rollers and capable of changing the distance between the rollers of each of said pairs of rollers, reducing the distance between the rollers of each of said pairs of rollers, whereby said rollers are disengageable from said cam surfaces and said cylindrical surface by reducing the circumferential distance between the rollers of each of said pairs of rollers with said roller retainer, wherein said roller separation springs comprise coil springs which each comprise a straight coil portion having a constant coil diameter over an entire axial length thereof, and a contact portion provided at one end of said straight coil portion and in contact with the corresponding roller, said contact portion having a larger diameter than said straight coil portion.

12. The rotation transmission device of claim 11 wherein, for each of said coil springs, said straight coil portion is constituted by plural turns of said coil spring.

* * * * *